(12) United States Patent
Li et al.

(10) Patent No.: US 10,499,414 B2
(45) Date of Patent: Dec. 3, 2019

(54) DATA TRANSMISSION APPARATUS, METHOD, AND SYSTEM

(71) Applicant: HUAWEI TECHNOLOGIES CO., LTD., Shenzhen, Guangdong (CN)

(72) Inventors: Mingchao Li, Beijing (CN); Guanglin Han, Munich (DE); Xiao Xiao, Beijing (CN); Yao Hua, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/926,846

(22) Filed: Mar. 20, 2018

(65) Prior Publication Data

US 2018/0213550 A1 Jul. 26, 2018

Related U.S. Application Data

(63) Continuation of application No. PCT/CN2015/090567, filed on Sep. 24, 2015.

(51) Int. Cl.
*H04W 72/12* (2009.01)
*H04W 72/04* (2009.01)
(Continued)

(52) U.S. Cl.
CPC ....... *H04W 72/1263* (2013.01); *H04W 72/02* (2013.01); *H04W 72/04* (2013.01);
(Continued)

(58) Field of Classification Search
CPC ............. H04W 72/1263; H04W 72/14; H04W 72/1284; H04W 72/0453; H04W 72/02;
(Continued)

(56) References Cited

U.S. PATENT DOCUMENTS

2015/0117293 A1* 4/2015 Cho ...................... H04W 76/14
370/312
2015/0327311 A1* 11/2015 Wei ...................... H04L 12/6418
370/329
(Continued)

FOREIGN PATENT DOCUMENTS

CA         2926378 A1     2/2014
CN       102300156 A     12/2011
(Continued)

OTHER PUBLICATIONS

PCT/CN2015/090567, International Search Report, dated Jun. 3, 2016, 4 pages.
(Continued)

*Primary Examiner* — Thai Nguyen
(74) *Attorney, Agent, or Firm* — Womble Bond Dickinson (US) LLP

(57) ABSTRACT

Embodiments of the present invention provide a data transmission method and apparatus, and relate to the communications field. The method includes: obtaining configuration information; establishing at least one logical channel according to an identifier of each logical channel and the corresponding transmission mode indication; obtaining a transmission resource according to the transmission mode indication of a logical channel to which device-to-device (D2D) buffered data belongs; and sending the D2D buffered data by using the obtained transmission resource. A problem that a resource allocation mode used by a terminal during D2D communication is relatively single and is not flexible enough is resolved, and the terminal can use different resource allocation modes according to a logical channel granularity, so that not only consumption of signaling resources of a network device can be reduced, but also QoS (Continued)

requirements of some services that require relatively high QoS can be satisfied.

20 Claims, 15 Drawing Sheets

(51) Int. Cl.
    *H04W 88/00*      (2009.01)
    *H04W 72/02*      (2009.01)
    *H04W 72/14*      (2009.01)
    *H04W 4/40*      (2018.01)

(52) U.S. Cl.
    CPC ..... *H04W 72/042* (2013.01); *H04W 72/0453* (2013.01); *H04W 72/1284* (2013.01); *H04W 72/14* (2013.01); *H04W 88/00* (2013.01); *H04W 4/40* (2018.02)

(58) Field of Classification Search
    CPC ... H04W 72/042; H04W 72/04; H04W 88/00; H04W 4/40
    See application file for complete search history.

(56) References Cited

U.S. PATENT DOCUMENTS

| | | | |
|---|---|---|---|
| 2016/0014831 A1* | 1/2016 | Lee | H04W 76/14 370/329 |
| 2017/0006649 A1 | 1/2017 | Zhao et al. | |
| 2017/0171837 A1 | 6/2017 | Chen et al. | |
| 2017/0295567 A1 | 10/2017 | Chen et al. | |

FOREIGN PATENT DOCUMENTS

| | | |
|---|---|---|
| CN | 104429147 A | 3/2015 |
| CN | 104768206 A | 7/2015 |
| CN | 104811892 A | 7/2015 |
| CN | 105101430 A | 11/2015 |
| EP | 2922360 A1 | 9/2015 |
| WO | 2015101218 A1 | 7/2015 |
| WO | 2015113398 A1 | 8/2015 |

OTHER PUBLICATIONS

XP050794365 R2-143304 Panasonic,"Support of SPS for D2D",3GPP TSG RAN WG2 Meeting #87,Dresden, Germany, Aug. 18-22, 2014,total 2 pages.

* cited by examiner

CONT.
FROM
FIG. 13A

CONT.
FROM
FIG. 13A

9062a. After sending the D2D buffered data in the logical channel having the first transmission mode indication, if there is a remaining transmission resource in the transmission resource, obtain a priority corresponding to each logical channel having the second transmission mode indication 9062b. Allocate, according to the priority and/or a data buffer size in each logical channel having the second transmission mode indication, the remaining transmission resource to at least one logical channel having the second transmission mode indication 9062c. Send, by using the remaining transmission resource, D2D buffered data in the logical channel to which the remaining transmission resource is allocated

FIG. 13B

DATA TRANSMISSION APPARATUS, METHOD, AND SYSTEM

CROSS-REFERENCE TO RELATED APPLICATIONS

This application is a continuation of International Application No. PCT/CN2015/090567, filed on Sep. 24, 2015, the disclosure of which is hereby incorporated by reference in its entirety.

TECHNICAL FIELD

Embodiments of the present invention relate to the communications field, and in particular, to a data transmission apparatus, method, and system.

BACKGROUND

A device-to-device (D2D) communication mode includes two modes that are respectively a D2D communication mode 1 and a D2D communication mode 2.

A centralized resource allocation scheme is used in the D2D communication mode 1. That is, when a terminal needs to send D2D data, the terminal needs to request a time-frequency resource from a network device. A distributed resource allocation scheme is used in the D2D communication mode 2. That is, when a terminal needs to send D2D data, the terminal needs to autonomously select a time-frequency resource from a preconfigured transmission resource pool.

For a terminal, when the terminal is in network coverage, a network device configures a specific mode that is in the D2D communication mode 1 and the D2D communication mode 2 and that is used by the terminal. In addition, at a specific moment, the network device can configure only one of the D2D communication mode 1 or the D2D communication mode 2 for the terminal. When the network device configures the D2D communication mode 1 for the terminal, all logical channels in the terminal use the D2D communication mode 1. In this case, the terminal needs to consume a large quantity of signaling resources of the network device. When the network device configures the D2D communication mode 2 for the terminal, all logical channels in the terminal use the D2D communication mode 2. In this case, it is difficult for the terminal to satisfy quality of service (QoS) requirements of some services. That is, a resource allocation mode used during D2D communication is relatively single and is not flexible enough.

SUMMARY

Embodiments of the present invention provide a data transmission apparatus, method, and system, so as to use different resource allocation modes according to a logical channel granularity, so that not only consumption of signaling resources of a network device can be reduced, but also QoS requirements of some services that require relatively high QoS can be satisfied.

According to a first aspect, a data transmission apparatus is provided, and the apparatus includes:

a processing module, configured to obtain configuration information, where the configuration information includes an identifier of at least one logical channel and a transmission mode indication corresponding to each of the at least one logical channel, and the transmission mode indication includes a first transmission mode indication or a second transmission mode indication, where the processing module is configured to establish the at least one logical channel according to the identifier of the logical channel and the corresponding transmission mode indication; and the processing module is configured to obtain a transmission resource according to the transmission mode indication of a logical channel to which device-to-device (D2D) buffered data belongs; and sending module, configured to send the D2D buffered data by using the transmission resource obtained by the processing module, where the logical channel having the first transmission mode indication uses a centralized resource allocation mode, and the logical channel having the second transmission mode indication uses a distributed resource allocation mode.

In a first possible implementation of the first aspect, the transmission mode indication of the logical channel to which the D2D buffered data belongs is the first transmission mode indication, and the apparatus further includes:

a receiving module, configured to receive grant information sent by a network device, where the grant information is used to indicate the transmission resource.

With reference to the first possible implementation of the first aspect, in a second possible implementation, the sending module is further configured to send a buffer status report to the network device, where the buffer status report carries a data buffer size of the D2D buffered data.

With reference to the first possible implementation of the first aspect, in a third possible implementation, the sending module is further configured to send, by using the transmission resource obtained by the processing module, the D2D buffered data in the logical channel having the first transmission mode indication; or the sending module is further configured to: preferentially send, by using the transmission resource obtained by the processing module, the D2D buffered data in the logical channel having the first transmission mode indication; and after sending the D2D buffered data in the logical channel having the first transmission mode indication, if there is still a remaining transmission resource in the transmission resource, send, by using the remaining transmission resource, the D2D buffered data in the logical channel having the second transmission mode indication.

With reference to the third possible implementation of the first aspect, in a fourth possible implementation, there are at least two logical channels having the second transmission mode indication;

the processing module is configured to: after the D2D buffered data in the logical channel having the first transmission mode indication is sent, if there is the remaining transmission resource in the transmission resource, obtain a priority corresponding to each logical channel having the second transmission mode indication;

the processing module is further configured to allocate, according to the priority and/or a data buffer size in each logical channel having the second transmission mode indication, the remaining transmission resource to at least one logical channel having the second transmission mode indication; and the sending module is further configured to send, by using the remaining transmission resource, the D2D buffered data in the logical channel to which the remaining transmission resource is allocated by the processing module.

With reference to the third possible implementation of the first aspect, in a fifth possible implementation, there are at least two logical channels having the second transmission mode indication;

the processing module is configured to: after the D2D buffered data in the logical channel having the first transmission mode indication is sent, if there is the remaining transmission resource in the transmission resource, obtain a priority and an upper limit to single transmission resource allocation that are corresponding to each second logical channel;

the processing module is further configured to allocate, according to the priority and the upper limit to single transmission resource allocation, the remaining transmission resource to the at least one logical channel having the second transmission mode indication; and the sending module is further configured to send, by using the remaining transmission resource, the D2D buffered data in the logical channel to which the remaining transmission resource is allocated by the processing module.

In a sixth possible implementation of the first aspect, the transmission mode indication of the logical channel to which the D2D buffered data belongs is the second transmission mode indication; and the processing module is configured to select the transmission resource from a transmission resource pool, where the transmission resource pool is a preconfigured transmission resource pool, the transmission resource pool is configured according to broadcast information from a network device, or the transmission resource pool is configured according to radio resource control (RRC) dedicated signaling from the network device.

With reference to the sixth possible implementation of the first aspect, in a seventh possible implementation, the sending module is configured to send, by using the transmission resource obtained by the processing module, the D2D buffered data in the logical channel having the second transmission mode indication; or the sending module is configured to: send, by using the transmission resource obtained by the processing module, the D2D buffered data that belongs to the logical channel having the second transmission mode indication; and after sending the D2D buffered data in the logical channel having the second transmission mode indication, if there is a remaining transmission resource in the transmission resource, send, by using the remaining transmission resource, the D2D buffered data in the logical channel having the first transmission mode indication.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation, the apparatus further includes the receiving module, where the receiving module is configured to receive broadcast information sent by the network device, where the broadcast information carries the configuration information; or the receiving module is configured to receive radio resource control (RRC) dedicated signaling sent by the network device, where the RRC dedicated signaling carries the configuration information; or the processing module is configured to obtain the configuration information that is preconfigured.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation, an identifier of the logical channel having the first transmission mode indication is different from an identifier of the logical channel having the second transmission mode indication; or an identifier of the logical channel having the first transmission mode indication is totally the same as, or partially the same as, an identifier of the logical channel having the second transmission mode indication.

With reference to the ninth possible implementation of the first aspect, in a tenth possible implementation, when the identifier of the logical channel having the first transmission mode indication is totally the same as, or partially the same as, the identifier of the logical channel having the second transmission mode indication, a Media Access Control protocol data unit (MAC PDU) header corresponding to a Media Access Control service data unit (MAC SDU) used for encapsulating the D2D buffered data carries a predetermined identifier, where the predetermined identifier is used to indicate an identifier of the logical channel to which the D2D buffered data belongs and the corresponding transmission mode indication.

According to a second aspect, a data transmission apparatus is provided, and the apparatus includes:

a processing module, configured to generate configuration information, where the configuration information includes an identifier of at least one logical channel and a transmission mode indication corresponding to each of the at least one logical channel, and the transmission mode indication includes a first transmission mode indication or a second transmission mode indication; and a sending module, configured to send the configuration information to a first terminal, where the logical channel having the first transmission mode indication uses a centralized resource allocation mode, and the logical channel having the second transmission mode indication uses a distributed resource allocation mode.

In a first possible implementation of the second aspect, the sending module is further configured to send grant information to the first terminal, where the grant information is used to indicate the transmission resource for transmitting device-to-device (D2D) buffered data, and the D2D buffered data is data in the logical channel having the first transmission mode indication.

In a second possible implementation of the second aspect, the apparatus further includes:

a receiving module, configured to receive a buffer status report sent by the first terminal, where the buffer status report carries a data buffer size of the D2D buffered data.

With reference to the second aspect, the first possible implementation of the second aspect, or the second possible implementation of the second aspect, in a third possible implementation of the second aspect, the sending module is configured to send broadcast information to the first terminal, where the broadcast information carries the configuration information; or the sending module is configured to send radio resource control (RRC) dedicated signaling to the first terminal, where the RRC dedicated signaling carries the configuration information.

According to a third aspect, a data transmission apparatus is provided, and the apparatus includes:

a receiving module, configured to receive device-to-device (D2D) buffered data sent by a first terminal by using a transmission resource, where the D2D buffered data is encapsulated in a Media Access Control service data unit (MAC SDU) of a Media Access Control protocol data unit (MAC PDU), the transmission resource is obtained by the first terminal according to the transmission mode indication of a logical channel to which the D2D buffered data belongs, and the transmission mode indication includes a first transmission mode indication or a second transmission mode indication; and a processing module, configured to report, to a corresponding upper-layer receiving entity according to a predetermined identifier added by each MAC SDU to a MAC header of the MAC PDU, the D2D buffered data encapsulated in the MAC SDU, where the predetermined identifier is used to indicate an identifier of the logical channel to which the D2D buffered data belongs and the corresponding transmission mode indication, where the logical channel having the first transmission mode indication uses a centralized resource allocation mode, and the logical channel having the second transmission mode indication uses a distributed resource allocation mode.

In a first possible implementation of the third aspect, the predetermined identifier includes the identifier of the logical channel to which the D2D buffered data belongs and the corresponding transmission mode indication, an identifier of the logical channel having the first transmission mode indication is totally the same as, or is different from, an identifier of the logical channel having the second transmission mode indication, and the first transmission mode indication is different from the second transmission mode indication.

According to a fourth aspect, a first terminal is provided, and the first terminal includes:

a processor, configured to obtain configuration information, where the configuration information includes an identifier of at least one logical channel and a transmission mode indication corresponding to each of the at least one logical channel, and the transmission mode indication includes a first transmission mode indication or a second transmission mode indication, where the processor is configured to establish the at least one logical channel according to the identifier of the logical channel and the corresponding transmission mode indication; and the processor is configured to obtain a transmission resource according to the transmission mode indication of a logical channel to which device-to-device (D2D) buffered data belongs; and a transmitter, configured to send the D2D buffered data by using the transmission resource obtained by the processor, where the logical channel having the first transmission mode indication uses a centralized resource allocation mode, and the logical channel having the second transmission mode indication uses a distributed resource allocation mode.

In a first possible implementation of the fourth aspect, the transmission mode indication of the logical channel to which the D2D buffered data belongs is the first transmission mode indication, and the apparatus further includes:

a receiver, configured to receive grant information sent by a network device, where the grant information is used to indicate the transmission resource.

With reference to the first possible implementation of the fourth aspect, in a second possible implementation, the transmitter is further configured to send a buffer status report to the network device, where the buffer status report carries a data buffer size of the D2D buffered data.

With reference to the first possible implementation of the fourth aspect, in a third possible implementation, the transmitter is further configured to send, by using the transmission resource obtained by the processor, the D2D buffered data in the logical channel having the first transmission mode indication; or the transmitter is further configured to: preferentially send, by using the transmission resource obtained by the processor, the D2D buffered data in the logical channel having the first transmission mode indication; and after sending the D2D buffered data in the logical channel having the first transmission mode indication, if there is still a remaining transmission resource in the transmission resource, send, by using the remaining transmission resource, the D2D buffered data in the logical channel having the second transmission mode indication.

With reference to the third possible implementation of the fourth aspect, in a fourth possible implementation, there are at least two logical channels having the second transmission mode indication;

the processor is configured to: after the D2D buffered data in the logical channel having the first transmission mode indication is sent, if there is the remaining transmission resource in the transmission resource, obtain a priority corresponding to each logical channel having the second transmission mode indication;

the processor is further configured to allocate, according to the priority and/or a data buffer size in each logical channel having the second transmission mode indication, the remaining transmission resource to at least one logical channel having the second transmission mode indication; and the transmitter is further configured to send, by using the remaining transmission resource, the D2D buffered data in the logical channel to which the remaining transmission resource is allocated by the processor.

With reference to the third possible implementation of the fourth aspect, in a fifth possible implementation, there are at least two logical channels having the second transmission mode indication;

the processor is configured to: after the D2D buffered data in the logical channel having the first transmission mode indication is sent, if there is the remaining transmission resource in the transmission resource, obtain a priority and an upper limit to single transmission resource allocation that are corresponding to each second logical channel;

the processor is further configured to allocate, according to the priority and the upper limit to single transmission resource allocation, the remaining transmission resource to the at least one logical channel having the second transmission mode indication; and the transmitter is further configured to send, by using the remaining transmission resource, the D2D buffered data in the logical channel to which the remaining transmission resource is allocated by the processor.

In a sixth possible implementation of the fourth aspect, the transmission mode indication of the logical channel to which the D2D buffered data belongs is the second transmission mode indication; and the processor is configured to select the transmission resource from a transmission resource pool, where the transmission resource pool is a preconfigured transmission resource pool, the transmission resource pool is configured according to broadcast information from a network device, or the transmission resource pool is configured according to radio resource control (RRC) dedicated signaling from the network device.

With reference to the sixth possible implementation of the fourth aspect, in a seventh possible implementation, the transmitter is configured to send, by using the transmission resource obtained by the processor, the D2D buffered data in the logical channel having the second transmission mode indication; or the transmitter is configured to: send, by using the transmission resource obtained by the processor, the D2D buffered data that belongs to the logical channel having the second transmission mode indication; and after sending the D2D buffered data in the logical channel having the second transmission mode indication, if there is a remaining transmission resource in the transmission resource, send, by using the remaining transmission resource, the D2D buffered data in the logical channel having the first transmission mode indication.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, or the seventh possible implementation of the fourth aspect, in an eighth possible implementation, the apparatus further includes the receiver, where the receiver is configured to receive broadcast information sent by the network device, where the broadcast information carries the configuration information; or the receiver is configured to receive radio resource control (RRC) dedicated signaling sent by the network device, where the RRC dedicated signaling carries the configuration information; or the processor is configured to obtain the configuration information that is preconfigured.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, or the eighth possible implementation of the fourth aspect, in a ninth possible implementation, an identifier of the logical channel having the first transmission mode indication is different from an identifier of the logical channel having the second transmission mode indication; or an identifier of the logical channel having the first transmission mode indication is totally the same as, or partially the same as, an identifier of the logical channel having the second transmission mode indication.

With reference to the ninth possible implementation of the fourth aspect, in a tenth possible implementation, when the identifier of the logical channel having the first transmission mode indication is totally the same as, or partially the same as, the identifier of the logical channel having the second transmission mode indication, a Media Access Control protocol data unit (MAC PDU) header corresponding to a Media Access Control service data unit (MAC SDU) used for encapsulating the D2D buffered data carries a predetermined identifier, where the predetermined identifier is used to indicate an identifier of the logical channel to which the D2D buffered data belongs and the corresponding transmission mode indication.

According to a fifth aspect, a data transmission apparatus is provided, and the apparatus includes:

a processor, configured to generate configuration information, where the configuration information includes an identifier of at least one logical channel and a transmission mode indication corresponding to each of the at least one logical channel, and the transmission mode indication includes a first transmission mode indication or a second transmission mode indication; and a transmitter, configured to send the configuration information to a first terminal, where the logical channel having the first transmission mode indication uses a centralized resource allocation mode, and the logical channel having the second transmission mode indication uses a distributed resource allocation mode.

In a first possible implementation of the fifth aspect, the transmitter is further configured to send grant information to the first terminal, where the grant information is used to indicate the transmission resource for transmitting device-to-device (D2D) buffered data, and the D2D buffered data is data in the logical channel having the first transmission mode indication.

With reference to the first possible implementation of the fifth aspect, in a second possible implementation, the apparatus further includes:

a receiver, configured to receive a buffer status report sent by the first terminal, where the buffer status report carries a data buffer size of the D2D buffered data.

With reference to the fifth aspect, the first possible implementation of the fifth aspect, or the second possible implementation of the fifth aspect, in a third possible implementation, the transmitter is configured to send broadcast information to the first terminal, where the broadcast information carries the configuration information; or the transmitter is configured to send radio resource control (RRC) dedicated signaling to the first terminal, where the RRC dedicated signaling carries the configuration information.

According to a sixth aspect, a second terminal is provided, and the second terminal includes:

a receiver, configured to receive device-to-device (D2D) buffered data sent by a first terminal by using a transmission resource, where the D2D buffered data is encapsulated in a Media Access Control service data unit (MAC SDU) of a Media Access Control protocol data unit (MAC PDU), the transmission resource is obtained by the first terminal according to the transmission mode indication of a logical channel to which the D2D buffered data belongs, and the transmission mode indication includes a first transmission mode indication or a second transmission mode indication; and a processor, configured to report, to a corresponding upper-layer receiving entity according to a predetermined identifier added by each MAC SDU to a MAC header of the MAC PDU, the D2D buffered data encapsulated in the MAC SDU, where the predetermined identifier is used to indicate an identifier of the logical channel to which the D2D buffered data belongs and the corresponding transmission mode indication, where the logical channel having the first transmission mode indication uses a centralized resource allocation mode, and the logical channel having the second transmission mode indication uses a distributed resource allocation mode.

In a first possible implementation of the sixth aspect, the predetermined identifier includes the identifier of the logical channel to which the D2D buffered data belongs and the corresponding transmission mode indication, an identifier of the logical channel having the first transmission mode indication is totally the same as, or is different from, an identifier of the logical channel having the second transmission mode indication, and the first transmission mode indication is different from the second transmission mode indication.

According to a seventh aspect, a data transmission method is provided, and the method includes:

obtaining, by a first terminal, configuration information, where the configuration information includes an identifier of at least one logical channel and a transmission mode indication corresponding to each of the at least one logical channel, and the transmission mode indication includes a first transmission mode indication or a second transmission mode indication;

establishing, by the first terminal, the at least one logical channel according to the identifier of the logical channel and the corresponding transmission mode indication;

obtaining, by the first terminal, a transmission resource according to the transmission mode indication of a logical channel to which device-to-device (D2D) buffered data belongs; and sending, by the first terminal, the D2D buffered data by using the obtained transmission resource, where the logical channel having the first transmission mode indication uses a centralized resource allocation mode, and the logical channel having the second transmission mode indication uses a distributed resource allocation mode.

In a first possible implementation of the seventh aspect, the transmission mode indication of the logical channel to which the D2D buffered data belongs is the first transmission mode indication; and the obtaining, by the first terminal, a transmission resource according to the transmission mode indication of a logical channel to which D2D buffered data belongs includes:

receiving grant information sent by a network device, where the grant information is used to indicate the transmission resource.

With reference to the first possible implementation of the seventh aspect, in a second possible implementation, before the receiving, by the first terminal, grant information sent by a network device, the method further includes:

sending a buffer status report to the network device, where the buffer status report carries a data buffer size of the D2D buffered data.

With reference to the first possible implementation of the seventh aspect, in a third possible implementation, the sending, by the first terminal, the D2D buffered data by using the obtained transmission resource includes:

sending, by using the transmission resource, the D2D buffered data in the logical channel having the first transmission mode indication; or preferentially sending, by using the transmission resource, the D2D buffered data in the logical channel having the first transmission mode indication; and after sending the D2D buffered data in the logical channel having the first transmission mode indication, if there is still a remaining transmission resource in the transmission resource, sending, by using the remaining transmission resource, the D2D buffered data in the logical channel having the second transmission mode indication.

With reference to the third possible implementation of the seventh aspect, in a fourth possible implementation, there are at least two logical channels having the second transmission mode indication; and the sending, by using the remaining transmission resource, the D2D buffered data in the logical channel having the second transmission mode indication, after sending the D2D buffered data in the logical channel having the first transmission mode indication, if there is a remaining transmission resource in the transmission resource includes:

after the D2D buffered data in the logical channel having the first transmission mode indication is sent, if there is the remaining transmission resource in the transmission resource, obtaining a priority corresponding to each logical channel having the second transmission mode indication;

allocating, according to the priority and/or a data buffer size in each logical channel having the second transmission mode indication, the remaining transmission resource to at least one logical channel having the second transmission mode indication; and sending, by using the remaining transmission resource, the D2D buffered data in the logical channel to which the remaining transmission resource is allocated.

With reference to the third possible implementation of the seventh aspect, in a fifth possible implementation, there are at least two logical channels having the second transmission mode indication; and the sending, by using the remaining transmission resource, D2D buffered data that belongs to the second logical channel, after sending the D2D buffered data in the logical channel having the first transmission mode indication, if there is a remaining transmission resource in the transmission resource includes:

after the D2D buffered data in the logical channel having the first transmission mode indication is sent, if there is the remaining transmission resource in the transmission resource, obtaining a priority and an upper limit to single transmission resource allocation that are corresponding to each second logical channel;

allocating, according to the priority and the upper limit to single transmission resource allocation, the remaining transmission resource to the at least one logical channel having the second transmission mode indication; and sending, by using the remaining transmission resource, the D2D buffered data in the logical channel to which the remaining transmission resource is allocated.

In a sixth possible implementation of the seventh aspect, the transmission mode indication of the logical channel to which the D2D buffered data belongs is the second transmission mode indication; and the obtaining, by the first terminal, a transmission resource according to the transmission mode indication of a logical channel to which D2D buffered data belongs includes:

selecting the transmission resource from a transmission resource pool, where the transmission resource pool is a preconfigured transmission resource pool, the transmission resource pool is configured according to broadcast information from a network device, or the transmission resource pool is configured according to radio resource control (RRC) dedicated signaling from the network device.

With reference to the sixth possible implementation of the seventh aspect, in a seventh possible implementation, the sending, by the first terminal, the D2D buffered data by using the obtained transmission resource includes:

sending, by using the transmission resource, the D2D buffered data in the logical channel having the second transmission mode indication; or sending, by using the transmission resource, the D2D buffered data that belongs to the logical channel having the second transmission mode indication; and after sending the D2D buffered data in the logical channel having the second transmission mode indication, if there is a remaining transmission resource in the transmission resource, sending, by using the remaining transmission resource, the D2D buffered data in the logical channel having the first transmission mode indication.

With reference to the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, the sixth possible implementation of the seventh aspect, or the seventh possible implementation of the seventh aspect, in an eighth possible implementation, the obtaining, by a first terminal, configuration information includes:

receiving broadcast information sent by the network device, where the broadcast information carries the configuration information; or receiving radio resource control (RRC) dedicated signaling sent by the network device, where the RRC dedicated signaling carries the configuration information; or obtaining the configuration information that is preconfigured.

With reference to the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, the sixth possible implementation of the seventh aspect, the seventh possible implementation of the seventh aspect, or the eighth possible implementation, in a ninth possible implementation, an identifier of the logical channel having the first transmission mode indication is different from an identifier of the logical channel having the second transmission mode indication; or an identifier of the logical channel having the first transmission mode indication is totally the same as, or partially the same as, an identifier of the logical channel having the second transmission mode indication.

With reference to the ninth possible implementation of the seventh aspect, in a tenth possible implementation, when the identifier of the logical channel having the first transmission mode indication is totally the same as, or partially the same as, the identifier of the logical channel having the second transmission mode indication, a Media Access Control protocol data unit (MAC PDU) header corresponding to a Media Access Control service data unit (MAC SDU) used for encapsulating the D2D buffered data carries a predetermined identifier, where the predetermined identifier is used to indicate an identifier of the logical channel to which the D2D buffered data belongs and the corresponding transmission mode indication.

According to an eighth aspect, a data transmission method is provided, and the method includes:

generating, by a network device, configuration information, where the configuration information includes an identifier of at least one logical channel and a transmission mode indication corresponding to each of the at least one logical channel, and the transmission mode indication includes a first transmission mode indication or a second transmission mode indication; and sending, by the network device, the configuration information to a first terminal, where the logical channel having the first transmission mode indication uses a centralized resource allocation mode, and the logical channel having the second transmission mode indication uses a distributed resource allocation mode.

In a first possible implementation of the eighth aspect, after the sending, by the network device, the configuration information to a first terminal, the method further includes:

sending grant information to the first terminal, where the grant information is used to indicate the transmission resource for transmitting device-to-device (D2D) buffered data, and the D2D buffered data is data in the logical channel having the first transmission mode indication.

With reference to the first possible implementation of the eighth aspect, in a second possible implementation, before the sending grant information to the first terminal, the method further includes:

receiving a buffer status report sent by the first terminal, where the buffer status report carries a data buffer size of the D2D buffered data.

With reference to the eighth aspect, the first possible implementation of the eighth aspect, or the second possible implementation of the eighth aspect, in a third possible implementation, the sending, by the network device, the configuration information to a first terminal includes:

sending broadcast information to the first terminal, where the broadcast information carries the configuration information; or sending radio resource control (RRC) dedicated signaling to the first terminal, where the RRC dedicated signaling carries the configuration information.

According to a ninth aspect, a data transmission method is provided, and the method includes:

receiving, by a second terminal, device-to-device (D2D) buffered data sent by a first terminal by using a transmission resource, where the D2D buffered data is encapsulated in a Media Access Control service data unit (MAC SDU) of a Media Access Control protocol data unit (MAC PDU), the transmission resource is obtained by the first terminal according to the transmission mode indication of a logical channel to which the D2D buffered data belongs, and the transmission mode indication includes a first transmission mode indication or a second transmission mode indication; and reporting, to a corresponding upper-layer receiving entity according to a predetermined identifier added by each MAC SDU to a MAC header of the MAC PDU, the D2D buffered data encapsulated in the MAC SDU, where the predetermined identifier is used to indicate an identifier of the logical channel to which the D2D buffered data belongs and the corresponding transmission mode indication, where the logical channel having the first transmission mode indication uses a centralized resource allocation mode, and the logical channel having the second transmission mode indication uses a distributed resource allocation mode.

In a first possible implementation of the ninth aspect, the predetermined identifier includes the identifier of the logical channel to which the D2D buffered data belongs and the corresponding transmission mode indication, an identifier of the logical channel having the first transmission mode indication is totally the same as, or is different from, an identifier of the logical channel having the second transmission mode indication, and the first transmission mode indication is different from the second transmission mode indication.

According to a tenth aspect, a data transmission system is provided, and the system includes a first terminal, a network device, and a second terminal, where the first terminal includes the data transmission apparatus provided in the first aspect or each possible implementation of the first aspect;

the network device includes the data transmission apparatus provided in the second aspect or each possible implementation of the second aspect; and the second terminal includes the data transmission apparatus provided in the third aspect or each possible implementation of the third aspect.

According to an eleventh aspect, a data transmission system is provided, and the system includes a first terminal, a network device, and a second terminal, where the first terminal includes the data transmission apparatus provided in the fourth aspect or each possible implementation of the fourth aspect;

the network device includes the data transmission apparatus provided in the fifth aspect or each possible implementation of the fifth aspect; and the second terminal includes the data transmission apparatus provided in the sixth aspect or each possible implementation of the sixth aspect.

Beneficial effects of the technical solutions provided in the embodiments of the present invention are as follows:

The corresponding transmission mode indication is configured for each logical channel, the logical channel having the first transmission mode indication uses the centralized resource allocation mode, and the logical channel having the second transmission mode indication uses the distributed resource allocation mode. In this way, a problem that a resource allocation mode used by a terminal during D2D communication is relatively single and is not flexible enough is resolved, and the terminal can use different resource allocation modes according to a logical channel granularity, so that not only consumption of signaling resources of the network device can be reduced, but also QoS requirements of some services that require relatively high QoS can be satisfied.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 13A and FIG. 13B are a flowchart of a data transmission method according to another embodiment of the present invention;

DESCRIPTION OF EMBODIMENTS

To make the objectives, technical solutions, and advantages of the present invention clearer, the following further describes the embodiments of the present invention in detail with reference to the accompanying drawings.

In an intelligent transportation system (ITS), vehicles may obtain road condition information in time or receive an information service in time by means of vehicle to vehicle (V2V) communication, vehicle to infrastructure (V2I) communication, or vehicle to pedestrian (V2P) communication. The V2V/V2I/V2P communication may be collectively referred to as V2X communication.

Figure 1:
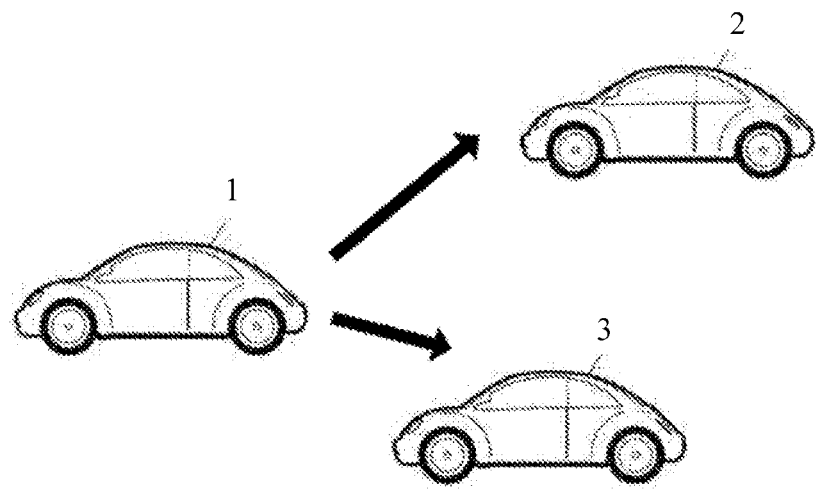
FIG. 1 is a schematic diagram of V2X communication in an intelligent transportation system.

Specifically, a vehicle may broadcast vehicle information to a surrounding vehicle/roadside unit/pedestrian by means of V2X communication, so that a driver in another vehicle or the pedestrian may better perceive a traffic condition beyond a visual range, so as to predetermine a danger situation to avoid the danger situation. The vehicle information may be information such as a speed of the vehicle, a driving direction of the vehicle, a specific location of the vehicle, and information about whether a driver performs emergency braking. As shown in FIG. 1, a vehicle 2 and a vehicle 3 are behind a vehicle 1. If a driver in the vehicle 1 performs emergency braking, the vehicle 1 sends information about the emergency braking to the vehicle 2 and the vehicle 3 by means of V2V communication, so as to remind drivers in the vehicle 2 and the vehicle 3 to predetermine a vehicle condition of the vehicle 1.

Information transmitted in the V2X communication is collectively referred to as V2X information. A vehicle sends the V2X information to the surrounding in a broadcast manner. A sending frequency is 1 to 10 Hz, and a size of the V2X information varies from about 50 to 1200 (including 50 and 1200) bytes. The V2X information may be roughly divided into a quasi-periodic service and an event-triggered service. For the quasi-periodic service, a transmission period of the quasi-periodic service is relatively fixed, and the quasi-periodic service is periodically sent. The event-triggered service is sent only when a specific event occurs, for example, when it is detected that a driver performs emergency braking.

Different types of services have different quality of service (QoS) requirements. For example, the quasi-periodic service may tolerate a larger time delay, and have a lower requirement for a packet loss rate. The event-triggered service may tolerate a shorter time delay, and have a higher requirement for a packet loss rate. When the V2X information is transmitted by using a D2D technology, a D2D communication mode 1 is applicable to the event-triggered service because the D2D communication mode 1 can provide a better QoS guarantee, and a D2D communication mode 2 is applicable to transmission of the quasi-periodic service.

If all logical channels of a terminal use the D2D communication mode 1 to transmit the V2X information, a large quantity of scheduling resources of a network device need to be consumed. If all logical channels of a terminal use the D2D communication mode 2 to transmit the V2X information, a QoS requirement of the event-triggered service may not be met. Therefore, a current mechanism cannot be totally applicable to a V2X information transmission scenario.

Embodiments of the present invention provide a data transmission method and apparatus, so as to change, from a terminal granularity to a channel granularity, a control granularity of a specific transmission mode used by a logical channel, so that all logical channels in a same terminal may use respective D2D communication modes.

Figure 2:
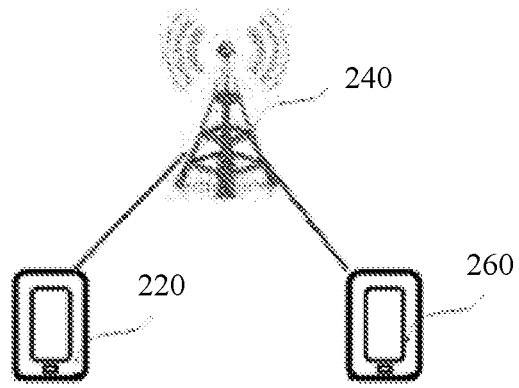
FIG. 2 is a schematic structural diagram of a data transmission system according to an embodiment of the present invention.

Referring to FIG. 2, FIG. 2 is a schematic structural diagram of a data transmission system 200 according to an embodiment of the present invention. The data transmission system 200 includes a first terminal 220, a network device 240, and a terminal 260.

The first terminal 220 may be an in-vehicle device, a vehicle having a mobile communication capability, or a communications terminal in another scenario. The first terminal 220 accesses a mobile communications network provided by the network device 240.

The network device 240 may be a NodeB or an evolved NodeB (eNB).

The second terminal 260 may be an in-vehicle device, a vehicle having a mobile communication capability, or a communications terminal in another scenario. The second terminal 260 accesses the mobile communications network provided by the network device 240.

When the first terminal 220 obtains a transmission resource, the first terminal 220 may directly communicate with the second terminal 240.

Figure 3:
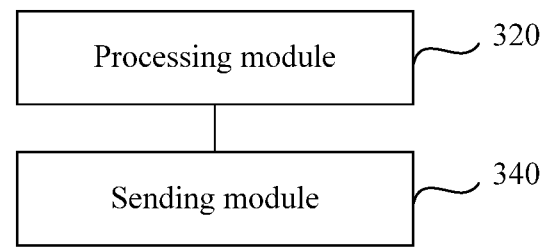
FIG. 3 is a structural block diagram of a data transmission apparatus according to an embodiment of the present invention.

Referring to FIG. 3, FIG. 3 is a block diagram of a data transmission apparatus according to an embodiment of the present invention. The data transmission apparatus may be implemented, as all or a part of the first terminal shown in FIG. 2, by using software, hardware, or a combination of software and hardware. The apparatus includes a processing module 320 and a sending module 340.

The processing module 320 is configured to obtain configuration information. The configuration information includes an identifier of at least one logical channel and a transmission mode indication corresponding to each of the at least one logical channel. The transmission mode indication includes a first transmission mode indication or a second transmission mode indication.

The processing module 320 is configured to establish the at least one logical channel according to the identifier of the logical channel and the corresponding transmission mode indication.

The processing module 320 is configured to obtain a transmission resource according to a transmission mode indication of a logical channel to which D2D buffered data belongs.

The sending module 340 is configured to send the D2D buffered data by using the transmission resource obtained by the processing module 320.

A logical channel having the first transmission mode indication uses a centralized resource allocation mode, and a logical channel having the second transmission mode indication uses a distributed resource allocation mode.

In conclusion, according to the data transmission apparatus provided in this embodiment, the corresponding transmission mode indication is configured for each logical channel, the logical channel having the first transmission mode indication uses the centralized resource allocation mode, and the logical channel having the second transmission mode indication uses the distributed resource allocation mode. In this way, a problem that a resource allocation mode used by a terminal during D2D communication is relatively single and is not flexible enough is resolved, and the terminal can use different resource allocation modes according to a logical channel granularity, so that not only consumption of signaling resources of a network device can be reduced, but also QoS requirements of some services that require relatively high QoS can be satisfied.

Figure 4:
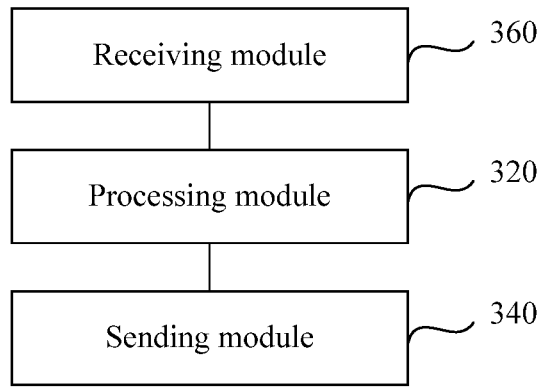
FIG. 4 is a structural block diagram of a data transmission apparatus according to another embodiment of the present invention.

In a first possible implementation based on the embodiment in FIG. 3, the transmission mode indication of the logical channel to which the D2D buffered data belongs is the first transmission mode indication. As shown in FIG. 4, the apparatus further includes a receiving module 360.

The receiving module 360 is configured to receive grant information sent by a network device. The grant information is used to indicate the transmission resource.

Optionally, the sending module 340 is further configured to send a buffer status report (BSR) to the network device before the receiving module 360 receives the grant information. The buffer status report carries a data buffer size of the D2D buffered data.

Optionally, the sending module 340 is further configured to send, by using the transmission resource obtained by the processing module 320, the D2D buffered data in the logical channel having the first transmission mode indication.

Alternatively, the sending module 340 is further configured to: preferentially send, by using the transmission resource obtained by the processing module 320, the D2D buffered data in the logical channel having the first transmission mode indication; and after sending the D2D buffered data in the logical channel having the first transmission mode indication, if there is still a remaining transmission resource in the transmission resource, send, by using the remaining transmission resource, D2D buffered data in the logical channel having the second transmission mode indication.

In a first possible implementation of allocating the remaining transmission resource, optionally, there are at least two logical channels having the second transmission mode indication.

The processing module 320 is configured to: after the D2D buffered data in the logical channel having the first transmission mode indication is sent, if there is the remaining transmission resource in the transmission resource, obtain a priority corresponding to each logical channel having the second transmission mode indication.

The processing module 320 is further configured to allocate, according to the priority and/or a data buffer size in each logical channel having the second transmission mode indication, the remaining transmission resource to at least one logical channel having the second transmission mode indication.

The sending module 340 is further configured to send, by using the remaining transmission resource, D2D buffered data in the logical channel to which the remaining transmission resource is allocated by the processing module 320.

In a second possible implementation of allocating the remaining transmission resource, optionally, there are at least two logical channels having the second transmission mode indication.

The processing module 320 is configured to: after the D2D buffered data in the logical channel having the first transmission mode indication is sent, if there is the remaining transmission resource in the transmission resource, obtain a priority and an upper limit to single transmission resource allocation that are corresponding to each second logical channel.

The processing module 320 is further configured to allocate, according to the priority and the upper limit to single transmission resource allocation, the remaining transmission resource to at least one logical channel having the second transmission mode indication.

The sending module 340 is further configured to send, by using the remaining transmission resource, D2D buffered data in the logical channel to which the remaining transmission resource is allocated by the processing module 320.

In a second possible implementation based on the embodiment in FIG. 3, the transmission mode indication of the logical channel to which the D2D buffered data belongs is the second transmission mode indication.

The processing module 320 is configured to select the transmission resource from a transmission resource pool.

The transmission resource pool is a preconfigured transmission resource pool, the transmission resource pool is configured according to broadcast information from a network device, or the transmission resource pool is configured according to radio resource control (RRC) dedicated signaling from the network device.

Optionally, the sending module 340 is configured to send, by using the transmission resource obtained by the processing module 320, the D2D buffered data in the logical channel having the second transmission mode indication.

Alternatively, the sending module 340 is configured to: send, by using the transmission resource obtained by the processing module 320, the D2D buffered data that belongs to the logical channel having the second transmission mode indication; and after sending the D2D buffered data in the logical channel having the second transmission mode indication, if there is a remaining transmission resource in the transmission resource, send, by using the remaining transmission resource, D2D buffered data in the logical channel having the first transmission mode indication.

Optionally, the receiving module 360 is configured to receive broadcast information sent by the network device. The broadcast information carries the configuration information. Alternatively, the receiving module 360 is configured to receive RRC dedicated signaling sent by the network device. The RRC dedicated signaling carries the configuration information.

Alternatively, the processing module 320 is configured to obtain the configuration information that is preconfigured.

Optionally, an identifier of the logical channel having the first transmission mode indication is different from an identifier of the logical channel having the second transmission mode indication.

Alternatively, an identifier of the logical channel having the first transmission mode indication is totally the same as, or partially the same as, an identifier of the logical channel having the second transmission mode indication.

Optionally, when the identifier of the logical channel having the first transmission mode indication is totally the same as, or partially the same as, the identifier of the logical channel having the second transmission mode indication, a Media Access Control protocol data unit (MAC PDU) header corresponding to a Media Access Control service data unit (MAC SDU) used for encapsulating the D2D buffered data carries a predetermined identifier.

The predetermined identifier is used to indicate an identifier of the logical channel to which the D2D buffered data belongs and the corresponding transmission mode indication.

It should be noted that, in a possible implementation, the processing module may be replaced with a processor, the sending module may be replaced with a transmitter, and the receiving module may be replaced with a receiver. The transmitter and the receiver are connected to the processor. The processor may be further connected to a memory. The memory stores an executable instruction of the processor.

Figure 5:
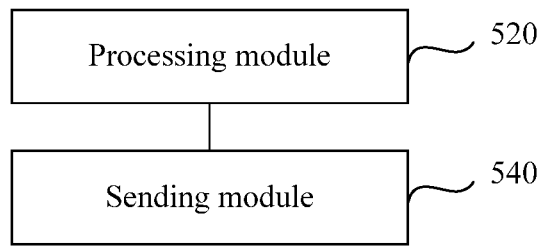
FIG. 5 is a structural block diagram of a data transmission apparatus according to an embodiment of the present invention.

Referring to FIG. 5, FIG. 5 is a structural block diagram of a data transmission apparatus according to an embodiment of the present invention. The apparatus may be implemented, as all or a part of the network device shown in FIG. 2, by using software, hardware, or a combination of software and hardware. The apparatus includes:

a processing module 520, configured to generate configuration information, where the configuration information includes an identifier of at least one logical channel and a transmission mode indication corresponding to each of the at least one logical channel, and the transmission mode indication includes a first transmission mode indication or a second transmission mode indication; and a sending module 540, configured to send the configuration information to a first terminal.

A logical channel having the first transmission mode indication uses a centralized resource allocation mode, and a logical channel having the second transmission mode indication uses a distributed resource allocation mode.

In conclusion, according to the data transmission apparatus provided in this embodiment, the corresponding transmission mode indication is configured for each logical channel, the logical channel having the first transmission mode indication uses the centralized resource allocation mode, and the logical channel having the second transmission mode indication uses the distributed resource allocation mode. In this way, a problem that a resource allocation mode used by a terminal during D2D communication is relatively single and is not flexible enough is resolved, and the terminal can use different resource allocation modes according to a logical channel granularity, so that not only consumption of signaling resources of the network device can be reduced, but also QoS requirements of some services that require relatively high QoS can be satisfied.

In an optional embodiment provided based on the embodiment in FIG. 5, the sending module 540 is further configured to send grant information to the first terminal. The grant information is used to indicate a transmission resource for transmitting D2D buffered data, and the D2D buffered data is data in the logical channel having the first transmission mode indication.

Figure 6:
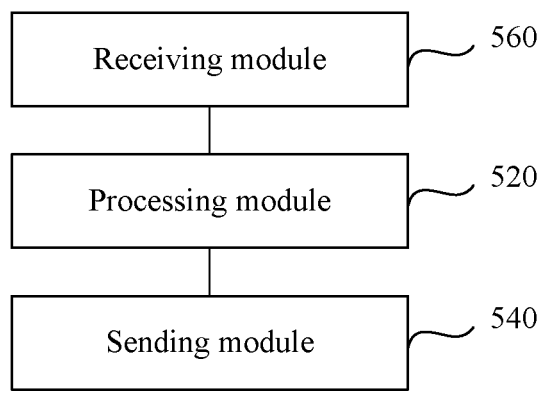
FIG. 6 is a structural block diagram of a data transmission apparatus according to another embodiment of the present invention.

In an optional embodiment provided based on the embodiment in FIG. 5, the apparatus further includes a receiving module 560. As shown in FIG. 6, the receiving module 560 is configured to receive a buffer status report sent by the first terminal. The buffer status report carries a data buffer size of the D2D buffered data.

In an optional embodiment provided based on the embodiment in FIG. 5, the sending module 540 is configured to send broadcast information to the first terminal. The broadcast information carries the configuration information. Alternatively, the sending module 540 is configured to send RRC dedicated signaling to the first terminal. The RRC dedicated signaling carries the configuration information.

It should be noted that, in a possible implementation, the processing module may be replaced with a processor, the sending module may be replaced with a transmitter, and the receiving module may be replaced with a receiver. The transmitter and the receiver are connected to the processor. The processor may be further connected to a memory. The memory stores an executable instruction of the processor.

Figures 7, 8:
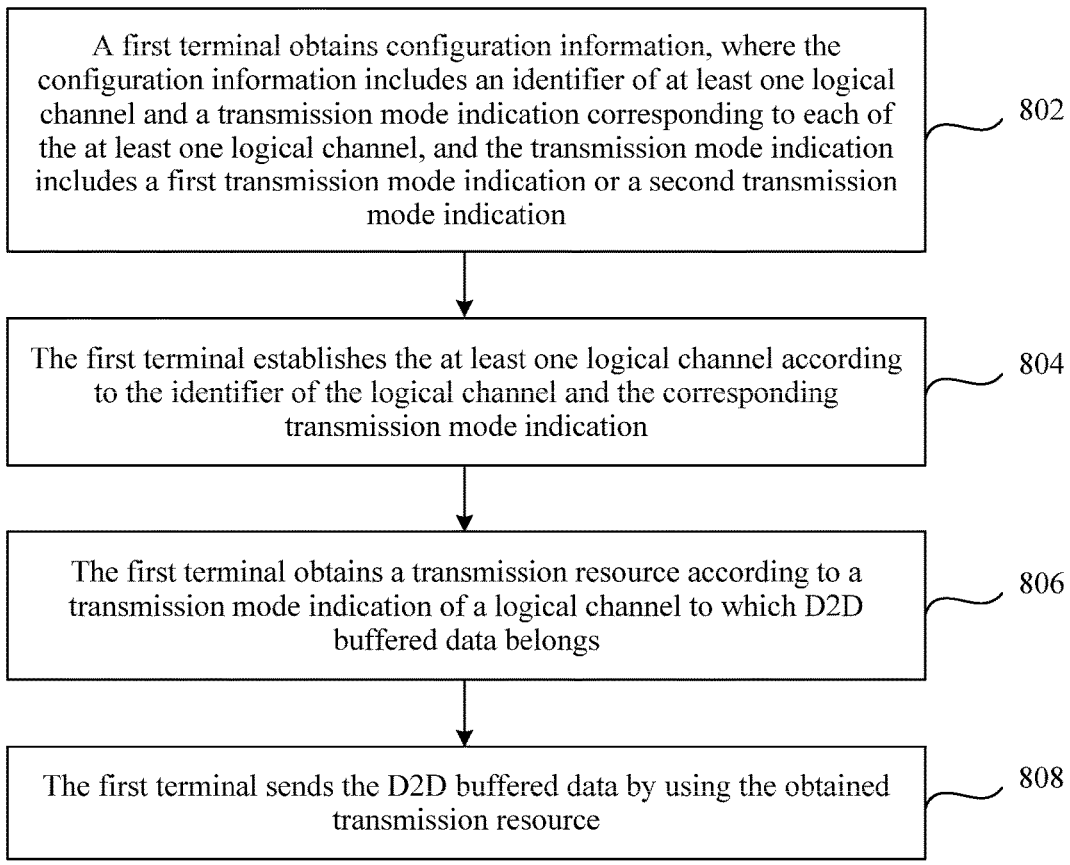
FIG. 7 is a structural block diagram of a data transmission apparatus according to an embodiment of the present invention.
FIG. 8 is a flowchart of a data transmission method according to an embodiment of the present invention.

Referring to FIG. 7, FIG. 7 is a structural block diagram of a data transmission apparatus according to an embodiment of the present invention. The data transmission apparatus may be implemented, as all or a part of the second terminal shown in FIG. 2, by using software, hardware, or a combination of software and hardware. The data transmission apparatus includes:

a receiving module 720, configured to receive D2D buffered data sent by a first terminal by using a transmission resource, where the D2D buffered data is encapsulated in a MAC SDU of a MAC PDU, the transmission resource is obtained by the first terminal according to a transmission mode indication of a logical channel to which the D2D buffered data belongs, and the transmission mode indication includes a first transmission mode indication or a second transmission mode indication; and a processing module 740, configured to report, to a corresponding upper-layer receiving entity according to a predetermined identifier added by each MAC SDU to a MAC header of the MAC PDU, the D2D buffered data encapsulated in the MAC SDU, where the predetermined identifier is used to indicate an identifier of the logical channel to which the D2D buffered data belongs and the corresponding transmission mode indication.

A logical channel having the first transmission mode indication uses a centralized resource allocation mode, and a logical channel having the second transmission mode indication uses a distributed resource allocation mode.

Optionally, the predetermined identifier includes the identifier of the logical channel to which the D2D buffered data belongs and the corresponding transmission mode indication, an identifier of the logical channel having the first transmission mode indication is totally the same as, or is different from, an identifier of the logical channel having the second transmission mode indication, and the first transmission mode indication is different from the second transmission mode indication.

In conclusion, the data transmission apparatus provided in this embodiment receives the D2D buffered data sent by the first terminal by using the transmission resource, where the D2D buffered data is encapsulated in the MAC SDU of the MAC PDU; and reports, to the corresponding upper-layer receiving entity according to the predetermined identifier added by each MAC SDU to the MAC header of the MAC PDU, the D2D buffered data encapsulated in the MAC SDU. In this way, a problem that a resource allocation mode used by a terminal during D2D communication is relatively single and is not flexible enough is resolved, and the terminal can use different resource allocation modes according to a logical channel granularity, so that not only consumption of signaling resources of a network device can be reduced, but also QoS requirements of some services that require relatively high QoS can be satisfied.

It should be noted that, in a possible implementation, the processing module may be replaced with a processor, and the receiving module may be replaced with a receiver. The receiver is connected to the processor. The processor may be further connected to a memory. The memory stores an executable instruction of the processor.

Referring to FIG. 8, FIG. 8 is a flowchart of a data transmission method according to an embodiment of the present invention. An example in which the data communication method is applied to the first terminal 220 shown in FIG. 2 is used for description in this embodiment. The method includes the following steps.

Step 802: The first terminal obtains configuration information, where the configuration information includes an identifier of at least one logical channel and a transmission mode indication corresponding to each of the at least one logical channel, and the transmission mode indication includes a first transmission mode indication or a second transmission mode indication.

A logical channel having the first transmission mode indication uses a centralized resource allocation mode. The centralized resource allocation mode is a mode in which a terminal requests a transmission resource from a network device when there is D2D buffered data.

A logical channel having the second transmission mode indication uses a distributed resource allocation mode. The distributed resource allocation mode is a mode in which a terminal autonomously selects a transmission resource from a preconfigured transmission resource pool when there is D2D buffered data.

Optionally, the configuration information includes configuration parameters of at least two logical channels. A transmission mode indication corresponding to one of the logical channels is the first transmission mode indication, and a transmission mode indication corresponding to another logical channel is the second transmission mode indication.

For example, example configuration information includes "logical channel identifier (LCID) 1, 1; LCID 2, 0; LCID 3, 1". That is, a logical channel corresponding to the LCID 1 has a first transmission mode indication 1, a logical channel corresponding to the LCID 2 has a second transmission mode indication 0, and a logical channel corresponding to the LCID 3 has the first transmission mode indication 1.

Step 804: The first terminal establishes the at least one logical channel according to the identifier of the logical channel and the corresponding transmission mode indication.

Optionally, in addition to the identifier of the logical channel and the corresponding transmission mode, a configuration parameter of the logical channel may include another configuration parameter, for example, one or more of a logical channel priority, Radio Link Control (RLC) entity configuration, Packet Data Convergence Protocol (PDCP) entity configuration, or an upper limit to single transmission resource allocation. A configuration method for the logical channel is the same as that in the prior art, and details are not described herein.

Step 806: The first terminal obtains a transmission resource according to a transmission mode indication of a logical channel to which D2D buffered data belongs.

Optionally, if the D2D buffered data is from an event-triggered service, the transmission mode indication of the logical channel to which the D2D buffered data belongs is the first transmission mode indication. If the D2D buffered data is from a quasi-periodic service, the transmission mode indication of the logical channel to which the D2D buffered data belongs is the second transmission mode indication.

Step 808: The first terminal sends the D2D buffered data by using the obtained transmission resource.

The D2D buffered data is sent to another terminal by using the obtained transmission resource.

In conclusion, according to the data communication method provided in this embodiment, the corresponding transmission mode indication is configured for each logical channel, the logical channel having the first transmission mode indication uses the centralized resource allocation mode, and the logical channel having the second transmission mode indication uses the distributed resource allocation mode. In this way, a problem that all logical channels in a terminal can use only a D2D communication mode 1 or a D2D communication mode 2 at a specific moment is resolved, so that each logical channel in the terminal can independently use the centralized resource allocation mode or the distributed resource allocation mode.

There are two types of transmission mode indications: a first transmission mode indication and a second transmission mode indication. Therefore, the following uses two embodiments as examples for separately describing transmission processes corresponding to the two transmission mode indications. An embodiment shown in FIG. 9 is used to describe a transmission process corresponding to the first transmission mode indication, and an embodiment shown in FIG. 10 is used to describe a transmission process corresponding to the second transmission mode indication.

Figure 9:
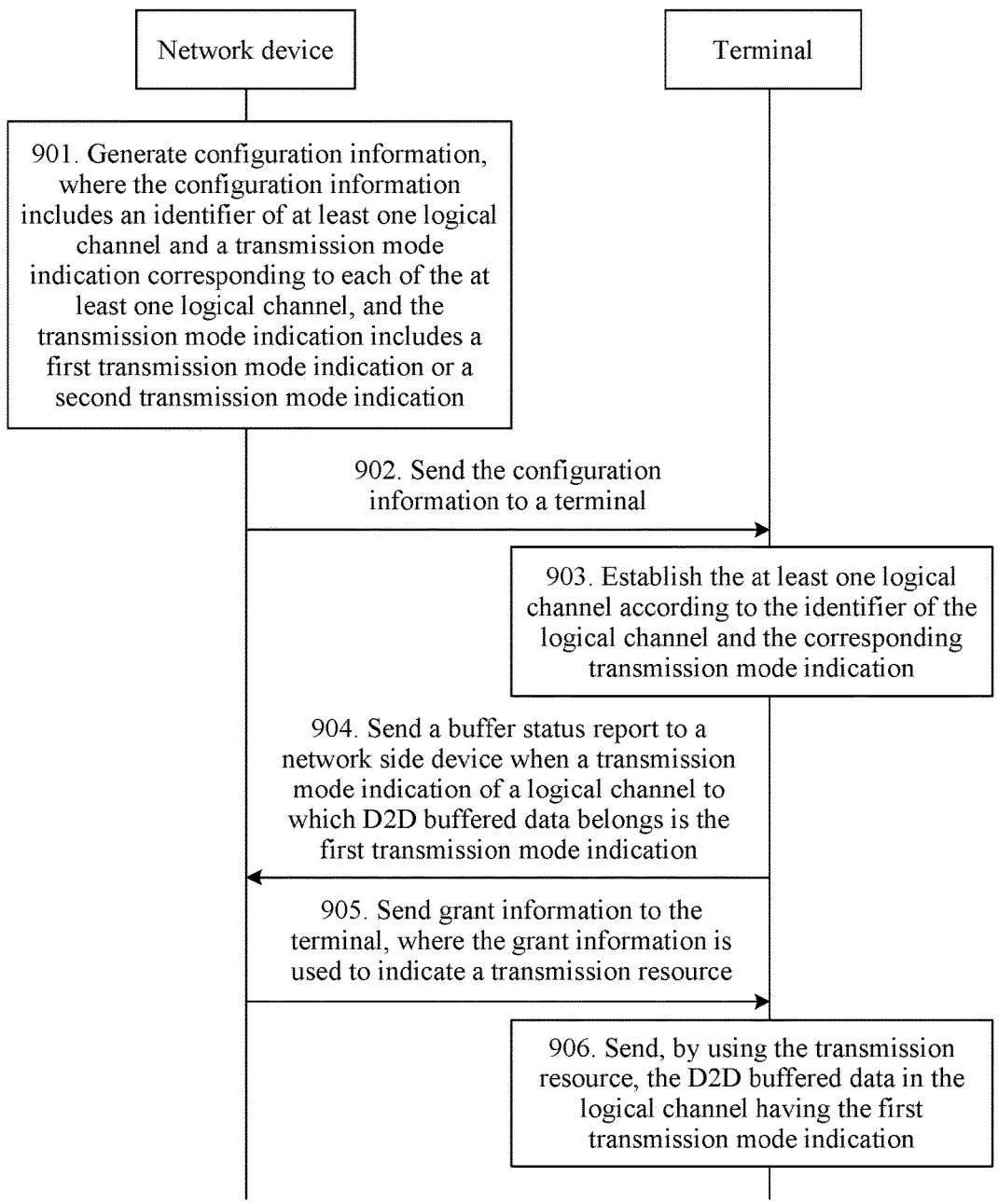
FIG. 9 is a flowchart of a data transmission method according to an embodiment of the present invention.
Figure 10:
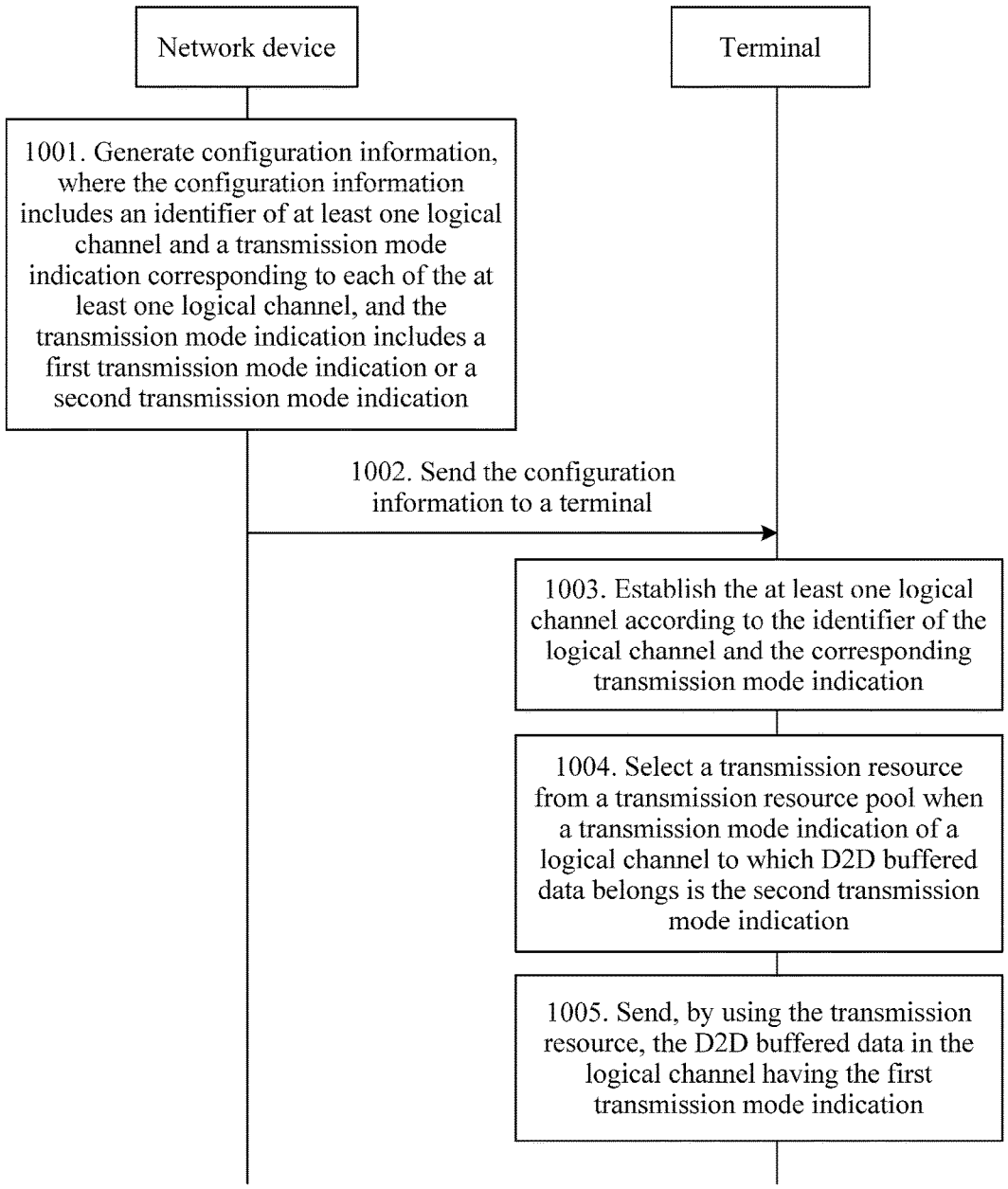
FIG. 10 is a flowchart of a data transmission method according to another embodiment of the present invention.

Referring to FIG. 9, FIG. 9 is a flowchart of a data transmission method according to another embodiment of the present invention. An example in which the data communication method is applied to the data transmission system shown in FIG. 2 is used for description in this embodiment. The data communication method includes the following steps.

Step 901: A network device generates configuration information, where the configuration information includes an identifier of at least one logical channel and a transmission mode indication corresponding to each of the at least one logical channel, and the transmission mode indication includes a first transmission mode indication or a second transmission mode indication.

A logical channel having the first transmission mode indication uses a centralized resource allocation mode, and a logical channel having the second transmission mode indication uses a distributed resource allocation mode.

For example, the configuration information includes "LCID 1, 1; LCID 2, 0". That is, a logical channel corresponding to the LCID 1 uses a first transmission mode indication 1, and a logical channel corresponding to the LCID 2 uses a second transmission mode indication 0.

Step 902: The network device sends the configuration information to a first terminal.

Correspondingly, the first terminal receives the configuration information sent by the network device.

Optionally, the network device sends broadcast information to the first terminal. The broadcast information carries the configuration information. The first terminal receives the broadcast information.

Optionally, the network device sends RRC dedicated signaling to the first terminal. The RRC dedicated signaling carries the configuration information. The first terminal receives the RRC dedicated signaling.

Step 903: The first terminal establishes the at least one logical channel according to the identifier of the logical channel and the corresponding transmission mode indication.

The first terminal establishes a first logical channel according to the LCID 1 and the first transmission mode indication 1, and establishes a second logical channel according to the LCID 2 and the second transmission mode indication 2.

Step 904: The first terminal sends a buffer status report to the network device when a transmission mode indication of a logical channel to which D2D buffered data belongs is the first transmission mode indication.

An upper-layer service entity in the first terminal generates D2D buffered data, and stores the D2D buffered data into a buffer of a corresponding logical channel. For example, an upper-layer service entity corresponding to an event-triggered service stores D2D buffered data into a buffer of the logical channel having the first transmission mode indication. An upper-layer service entity corresponding to a quasi-periodic service stores D2D buffered data into a buffer of the logical channel having the second transmission mode indication.

When the transmission mode indication of the logical channel to which the D2D buffered data belongs is the first transmission mode indication, the first terminal determines, according to a predetermined condition, to enable the centralized resource allocation mode. Optionally, the predetermined condition includes but is not limited to the following conditions:

1. Before the D2D buffered data is transmitted to a buffer of the corresponding logical channel having the first transmission mode indication, there is no valid data in the buffer of the corresponding logical channel, the corresponding logical channel has the first transmission mode indication, and there is currently no valid data in another logical channel having the first transmission mode indication.

2. The logical channel to which the D2D buffered data belongs has the first transmission mode indication, and a remaining transmission resource in a currently obtained transmission resource can accommodate the buffer status report corresponding to the D2D buffered data.

3. The logical channel to which the D2D buffered data belongs has the first transmission mode indication, and a buffer status report (BSR) timer expires. Optionally, timing duration of the BSR timer may be obtained based on the configuration information sent by the network device.

4. The transmission mode indication of the logical channel to which the D2D buffered data belongs is switched from the second transmission mode indication to the first transmission mode indication.

After enabling the centralized resource allocation mode, the first terminal sends the buffer status report to the network device. The BSR carries a data buffer size of the D2D buffered data.

The BSR includes only a data buffer size in a logical channel having the first transmission mode indication and a corresponding logical channel group identifier. That is, the BSR may include data buffer sizes in a plurality of logical channels having the first transmission mode indication.

For example, first D2D buffered data, second D2D buffered data, and third D2D buffered data are stored in a buffer of the first terminal. The first D2D buffered data and the third D2D buffered data respectively belong to the first logical channel and a third logical channel, and both the first logical channel and the third logical channel have the first transmission mode indication. The second D2D buffered data belongs to the second logical channel, and the second logical channel has the second transmission mode indication. In this case, when sending the BSR, the first terminal reports only a logical channel group identifier corresponding to the first logical channel and the third logical channel, a data buffer size of the first D2D buffered data, and a data buffer size of the third D2D buffered data.

Correspondingly, the network device receives the BSR sent by the terminal.

Step 905: The network device sends grant information to the first terminal, where the grant information is used to indicate a transmission resource.

The network device sends the grant information according to the BSR. The grant information is used to indicate, to the terminal, the transmission resource for transmitting the D2D buffered data.

Correspondingly, the first terminal receives the grant information sent by the network device.

Step 906: The first terminal sends, by using the transmission resource, the D2D buffered data in the logical channel having the first transmission mode indication.

The first terminal sends, to a second terminal by using the transmission resource indicated by the grant information, the D2D buffered data in the logical channel having the first transmission mode indication.

When sending the D2D buffered data, the first terminal needs to encapsulate the D2D buffered data in a MAC PDU format for sending.

In conclusion, according to the data transmission method provided in this embodiment, the corresponding transmission mode indication is configured for each logical channel, the logical channel having the first transmission mode indication uses the centralized resource allocation mode, and the logical channel having the second transmission mode indication uses the distributed resource allocation mode. In this way, a problem that a resource allocation mode used by a terminal during D2D communication is relatively single and is not flexible enough is resolved, and the terminal can use different resource allocation modes according to a logical channel granularity, so that not only consumption of signaling resources of the network device can be reduced, but also QoS requirements of some services that require relatively high QoS can be satisfied.

According to the data communication method provided in this embodiment, in addition, when the transmission mode indication of the logical channel to which the D2D buffered data belongs is the first transmission mode indication, the first terminal requests the transmission resource from the network device, and transmits the D2D buffered data by using the transmission resource indicated by the grant information, so that a QoS requirement of the D2D buffered data corresponding to the event-triggered service is satisfied as much as possible. In other words, the first terminal may distinguish between the logical channel having the first transmission mode indication and the logical channel having the second transmission mode indication, so as to transmit, by using the transmission resource indicated by the grant information, D2D buffered data in all logical channels having the first transmission mode indication.

It should be noted that step 902 is an optional step. In an alternative implementation, the first terminal may obtain preconfigured configuration information. The preconfigured configuration information may be configuration information that is configured inside the first terminal at delivery or during system update.

It should be further noted that step 904 is an optional step. If there is a remaining transmission resource in the currently obtained transmission resource, the terminal may not perform step 904. Alternatively, if the terminal receives, after sending the BSR to the network device, n pieces of grant information periodically sent by the network device, the terminal does not need to perform step 904 for latter grant information.

It should be further noted that, before the terminal sends the BSR, in view of a current actual case, the terminal may further need to send scheduling request (SR) information or random access channel (RACH) information to the network device. This is content well known to a person skilled in the art, and details are not described in this specification.

Referring to FIG. 10, FIG. 10 is a flowchart of a data transmission method according to another embodiment of the present invention. An example in which the data communication method is applied to the data transmission system shown in FIG. 2 is used for description in this embodiment. The data transmission method includes the following steps.

Step 1001: A network device generates configuration information.

A logical channel having a first transmission mode indication uses a centralized resource allocation mode, and a logical channel having a second transmission mode indication uses a distributed resource allocation mode.

For example, the configuration information includes "LCID 1, 1; LCID 2, 0". That is, a logical channel corresponding to the LCID 1 uses a first transmission mode indication 1, and a logical channel corresponding to the LCID 2 uses a second transmission mode indication 0.

Step 1002: The network device sends the configuration information to a first terminal.

Correspondingly, the first terminal receives the configuration information sent by the network device.

Step 1003: The first terminal establishes at least one logical channel according to an identifier of the logical channel and a corresponding transmission mode indication.

The first terminal establishes a first logical channel according to the LCID 1 and the first transmission mode indication 1, and establishes a second logical channel according to the LCID 2 and the second transmission mode indication 2.

Step 1004: The first terminal selects a transmission resource from a transmission resource pool when a transmission mode indication of a logical channel to which D2D buffered data belongs is a second transmission mode indication.

The transmission resource pool is a preconfigured transmission resource pool, the transmission resource pool is configured according to broadcast information from the network device, or the transmission resource pool is configured according to RRC dedicated signaling from the network device.

An upper-layer service entity in the first terminal generates D2D buffered data, and stores the D2D buffered data into a buffer of a corresponding logical channel. For example, an upper-layer service entity corresponding to an event-triggered service stores D2D buffered data into a buffer of the first logical channel, and an upper-layer service entity corresponding to a quasi-periodic service stores D2D buffered data into a buffer of the second logical channel.

The first terminal selects the transmission resource from the transmission resource pool when the transmission mode indication of the logical channel to which the D2D buffered data belongs is the second transmission mode indication.

A selection policy of the first terminal is not limited in this embodiment. For example, the first terminal selects the transmission resource from the transmission resource pool according to a random selection policy.

Optionally, the first terminal further obtains a modulation and coding scheme corresponding to the D2D buffered data. The modulation and coding scheme may be obtained by using broadcast information or RRC dedicated signaling from the network device.

Step 1005: The first terminal sends, by using the transmission resource, the D2D buffered data in the logical channel having the second transmission mode indication.

The first terminal sends, to a second terminal by using the selected transmission resource, the D2D buffered data in the logical channel having the second transmission mode indication.

When sending the D2D buffered data, the first terminal needs to encapsulate the D2D buffered data in a MAC PDU format for sending; and in a sending process, send the D2D buffered data by using the modulation and coding scheme corresponding to the D2D buffered data.

In conclusion, according to the data transmission method provided in this embodiment, a corresponding transmission mode indication is configured for each logical channel, the first transmission mode indication is used to indicate that a logical channel uses the centralized resource allocation mode, and the second transmission mode indication is used to indicate that a logical channel uses the distributed resource allocation mode. In this way, a problem that a resource allocation mode used by a terminal during D2D communication is relatively single and is not flexible enough is resolved, and the terminal can use different resource allocation modes according to a logical channel granularity, so that not only consumption of signaling resources of the network device can be reduced, but also QoS requirements of some services that require relatively high QoS can be satisfied.

According to the data communication method provided in this embodiment, in addition, when the transmission mode indication of the logical channel to which the D2D buffered data belongs is the second transmission mode indication, the first terminal selects the transmission resource from the transmission resource pool to transmit the D2D buffered data, so as to reduce system signaling resources that need to be consumed when the first terminal sends the quasi-periodic service. In other words, the first terminal may distinguish between the logical channel having the second transmission mode indication and the logical channel having the first transmission mode indication, so as to transmit, by using the transmission resource selected from the transmission resource pool, D2D buffered data in all logical channels having the second transmission mode indication.

It should be noted that step 1002 is an optional step. In an alternative implementation, the terminal may obtain preconfigured configuration information. The preconfigured configuration information may be configuration information that is configured inside the first terminal at delivery or during system update.

Figure 11:
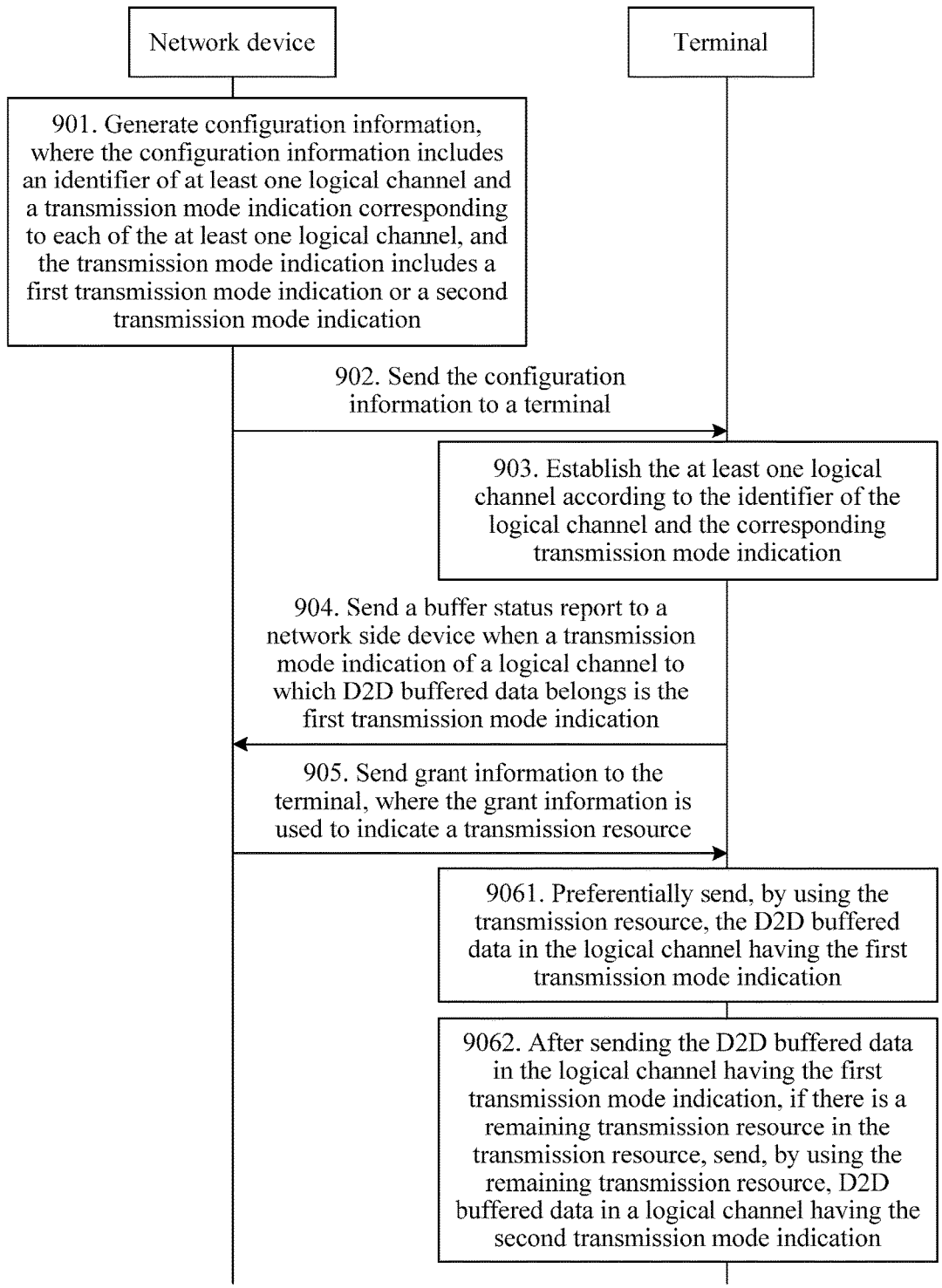
FIG. 11 is a flowchart of a data transmission method according to another embodiment of the present invention.

In the embodiment in FIG. 9, there may be a remaining transmission resource in the transmission resource indicated by the grant information. Optionally, as shown in FIG. 11, step 906 may be replaced with step 9061 and step 9062 for implementation.

Step 9061: Preferentially send, by using the transmission resource, the D2D buffered data in the logical channel having the first transmission mode indication.

Step 9062: After sending the D2D buffered data in the logical channel having the first transmission mode indication, if there is a remaining transmission resource in the transmission resource, send, by using the remaining transmission resource, D2D buffered data in a logical channel having the second transmission mode indication.

Figure 12:
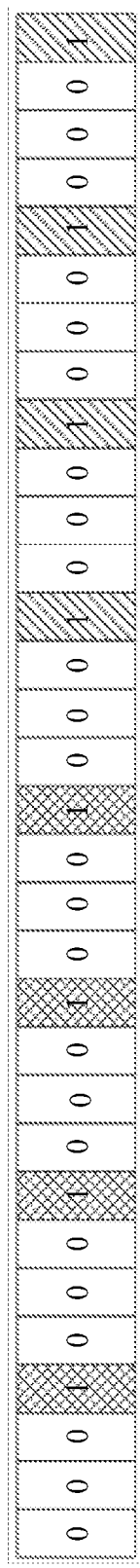
FIG. 12 is a schematic diagram of subframes in the data transmission method provided in the embodiment in FIG. 11.

As shown in FIG. 12, it is assumed that the transmission resource obtained by the first terminal includes eight subframes indicated as 1 in a bitmap. If the first terminal completes sending, by using the first four subframes indicated as 1 in the bitmap, of the D2D buffered data in the logical channel having the first transmission mode indication, the last four subframes indicated as 1 in the bitmap are used as the remaining transmission resource, and may be used to send the D2D buffered data in the logical channel having the second transmission mode indication.

Figure 13A:
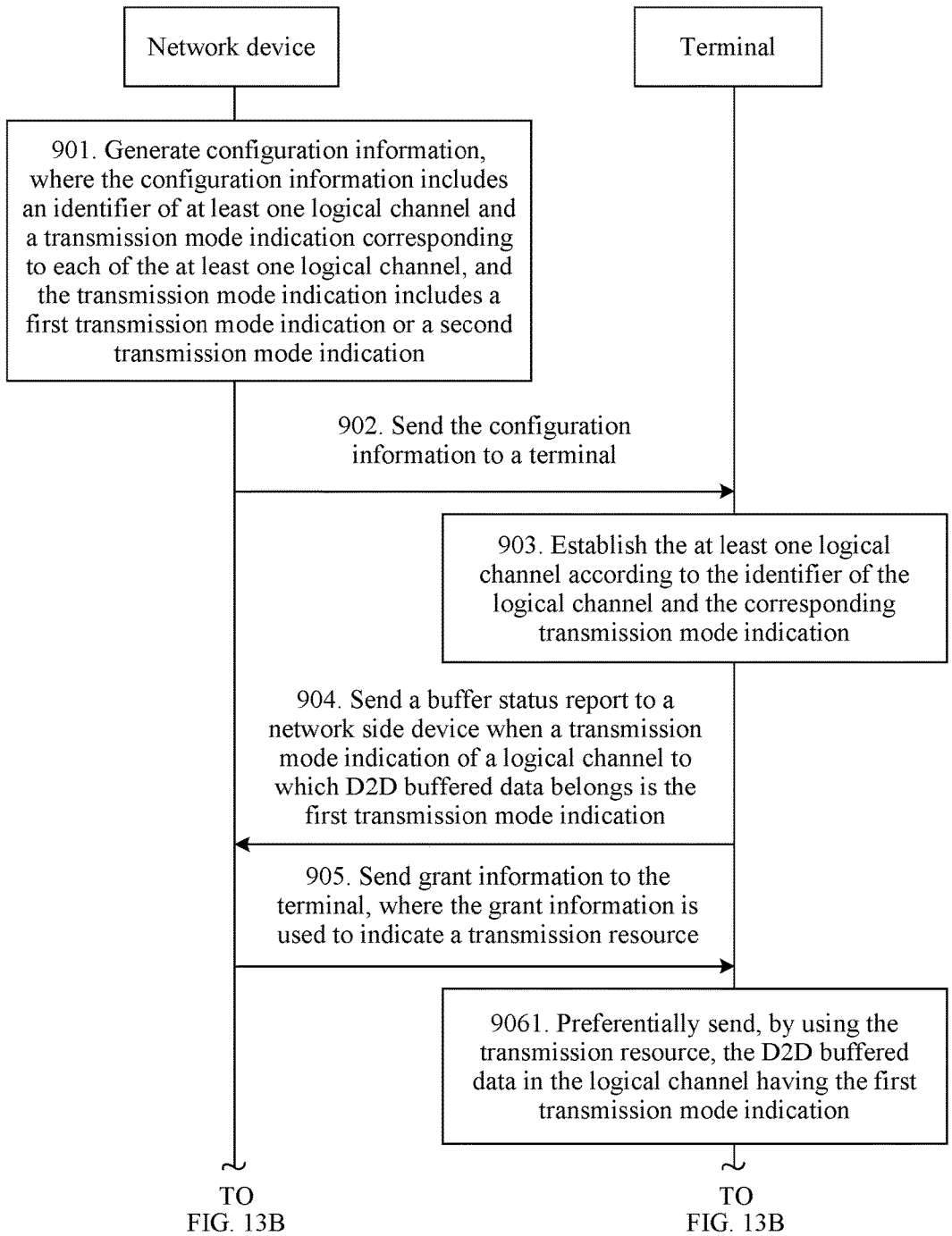
Figure 14A:
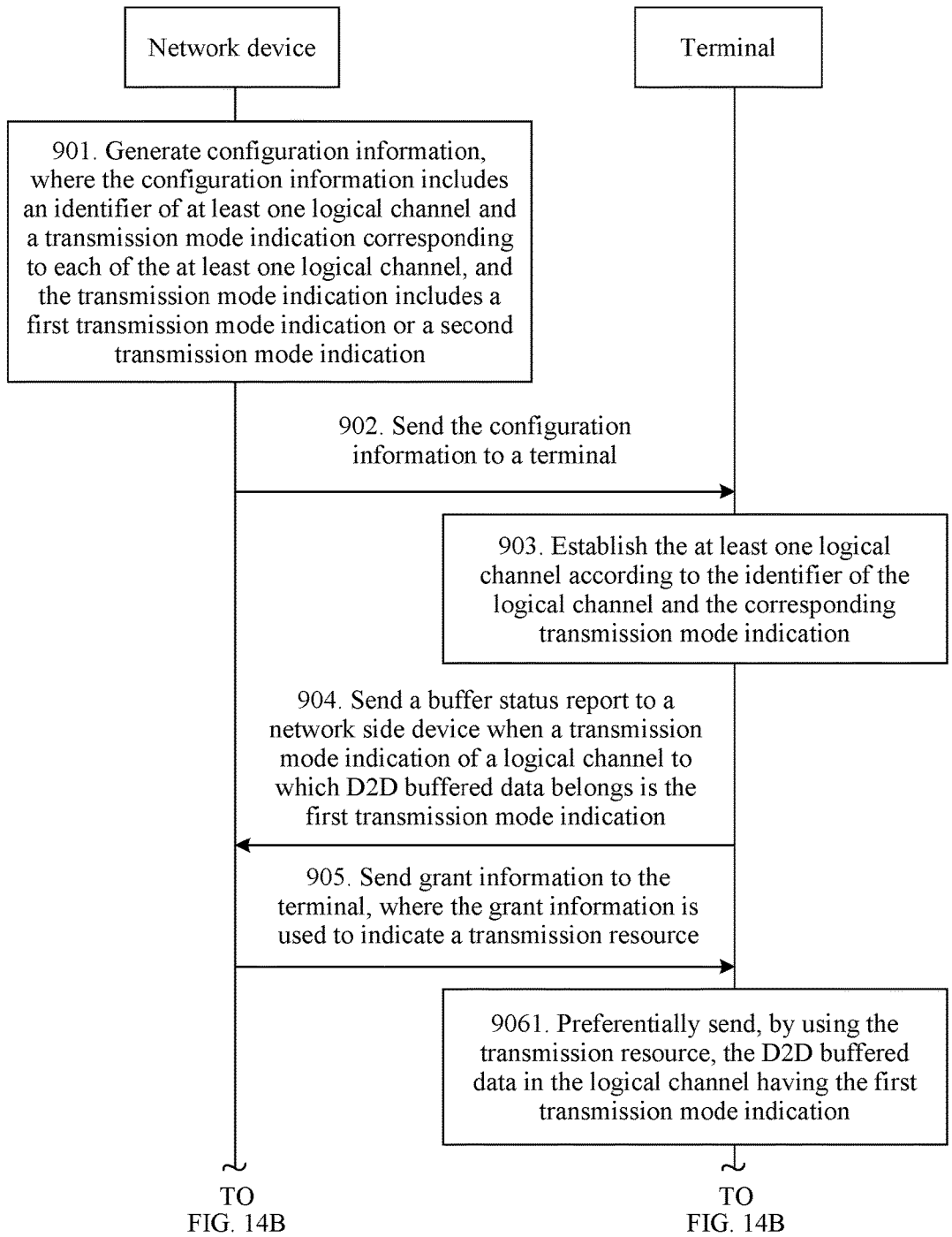
FIG. 14A and FIG. 14B are a flowchart of a data transmission method according to another embodiment of the present invention.
Figure 14B:
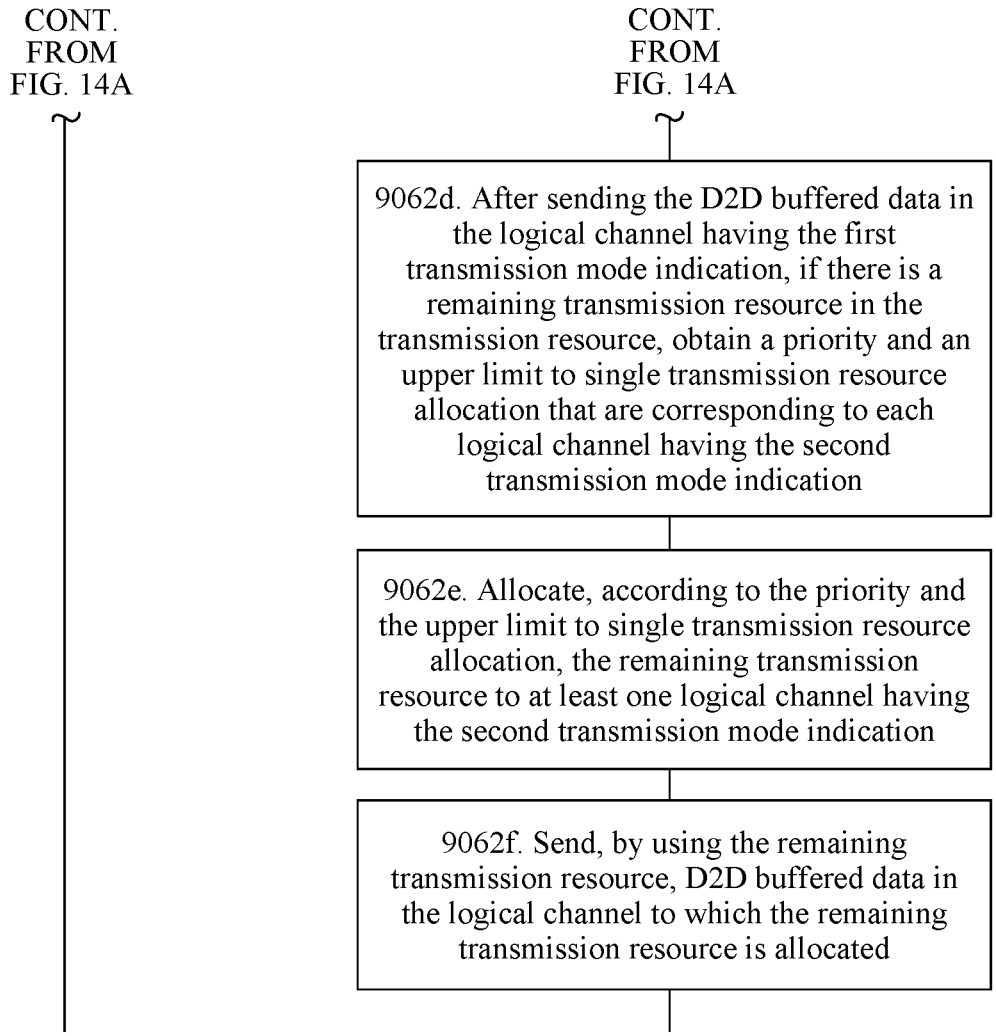

According to different policies of allocating the remaining transmission resource, step 9062 may further have two possible implementations that are respectively shown in FIG. 13B or FIG. 14B.

As shown in FIG. 13B, in a first possible implementation, that is, in a logical token bucket-based multiplex mechanism at a MAC layer, step 9062 may be replaced with steps 9062a to 9062c for implementation.

Step 9062a: After sending the D2D buffered data in the logical channel having the first transmission mode indication, if there is a remaining transmission resource in the transmission resource, obtain a priority corresponding to each logical channel having the second transmission mode indication.

Step 9062b: Allocate, according to the priority and/or a data buffer size in each logical channel having the second transmission mode indication, the remaining transmission resource to at least one logical channel having the second transmission mode indication.

For example, currently, there is a logical channel 2 having the first transmission mode indication and two logical channels having the second transmission mode indication. The two logical channels having the second transmission mode indication are respectively a logical channel 2 and a logical channel 3, and a priority of the logical channel 2 is higher than that of the logical channel 3. A data buffer size in the logical channel 1 is 300 bytes, a data buffer size in the logical channel 2 is 150 bytes, and a data buffer size in the logical channel 3 is 100 bytes. If a size of data that can be sent by using the transmission resource that is indicated by the grant information and that is obtained by the first terminal is 500 bytes, after the first terminal completes sending of 300-byte data in the logical channel 1, a size of data that can be transmitted by using the remaining transmission resource is 200 bytes.

In this case, according to the priority, the terminal first allocates a 150-byte transmission resource in the remaining 200-byte transmission resource to the logical channel 2, and then allocates a 50-byte transmission resource to the logical channel 3 That is, a requirement of a logical channel with a higher priority is met to the greatest extent.

For another example, currently, there is a logical channel 1 having the first transmission mode indication and two logical channels having the second transmission mode indication. The two logical channels having the second transmission mode indication are respectively a logical channel 2 and a logical channel 3, and a priority of the logical channel 2 is higher than that of the logical channel 3. A data buffer size in the logical channel 1 is 300 bytes, a data buffer size in the logical channel 2 is 300 bytes, and a data buffer size in the logical channel 3 is 100 bytes. If a size of data that can be sent by using the transmission resource that is indicated by the grant information and that is obtained by the first terminal is 500 bytes, after the first terminal completes sending of 300-byte data in the logical channel 1, a size of data that can be transmitted by using the remaining transmission resource is 200 bytes.

In this case, according to the data buffer size, the terminal first preferentially allocates a 100-byte transmission resource in the remaining 200-byte transmission resource to the logical channel 3, and then allocates a 100-byte transmission resource to the logical channel 2. That is, a requirement of a logical channel with a small data buffer size is met to the greatest extent.

Step 9062c: Send, by using the remaining transmission resource, D2D buffered data in the logical channel to which the remaining transmission resource is allocated.

As shown in FIG. 14B, in a second possible implementation, step 9062 may be replaced with steps 9062d to 9062f for implementation.

Step 9062d: After sending the D2D buffered data in the logical channel having the first transmission mode indication, if there is a remaining transmission resource in the transmission resource, obtain a priority and an upper limit to single transmission resource allocation that are corresponding to each logical channel having the second transmission mode indication.

Step 9062e: Allocate, according to the priority and the upper limit to single transmission resource allocation, the remaining transmission resource to at least one logical channel having the second transmission mode indication.

For example, currently, there is a logical channel 1 having the first transmission mode indication and two logical channels having the second transmission mode indication. The two logical channels having the second transmission mode indication are respectively a logical channel 2 and a logical channel 3, and a priority of the logical channel 2 is higher than that of the logical channel 3. A data buffer size in the logical channel 1 is 300 bytes, a data buffer size in the logical channel 2 is 150 bytes, and a data buffer size in the logical channel 3 is 100 bytes. If a size of data that can be sent by using the transmission resource that is indicated by the grant information and that is obtained by the terminal is 500 bytes, after the terminal completes sending of 300-byte data in the logical channel 1, a size of data that can be transmitted by using the remaining transmission resource is 200 bytes.

According to a related technology, there is further an upper limit to single transmission resource allocation in each of the logical channel 2 and the logical channel 3. It is assumed that an upper limit to single transmission resource allocation in the logical channel 2 is 110 bytes, and an upper limit to single transmission resource allocation in the logical channel 3 is 80 bytes.

In this case, according to the priority, the terminal first allocates a 110-byte transmission resource in the remaining 200-byte transmission resource to the logical channel 2, then allocates an 80-byte transmission resource to the logical channel 3, and afterward allocates a remaining 10-byte transmission resource to the logical channel 2. In this case, the 120-byte transmission resource in the remaining 200-byte transmission resource is allocated to the logical channel 2, and the 80-byte transmission resource is allocated to the logical channel 3.

Step 9062f: Send, by using the remaining transmission resource, D2D buffered data in the logical channel to which the remaining transmission resource is allocated.

In conclusion, according to the data transmission method provided in this embodiment, the remaining transmission resource is used to send the data in the logical channel having the second transmission mode indication, so that the transmission resource is effectively used, that is, a possibility of wasting the transmission resource indicated by the grant information is reduced, and utilization of the transmission resource indicated by the grant information is improved.

Figure 15:
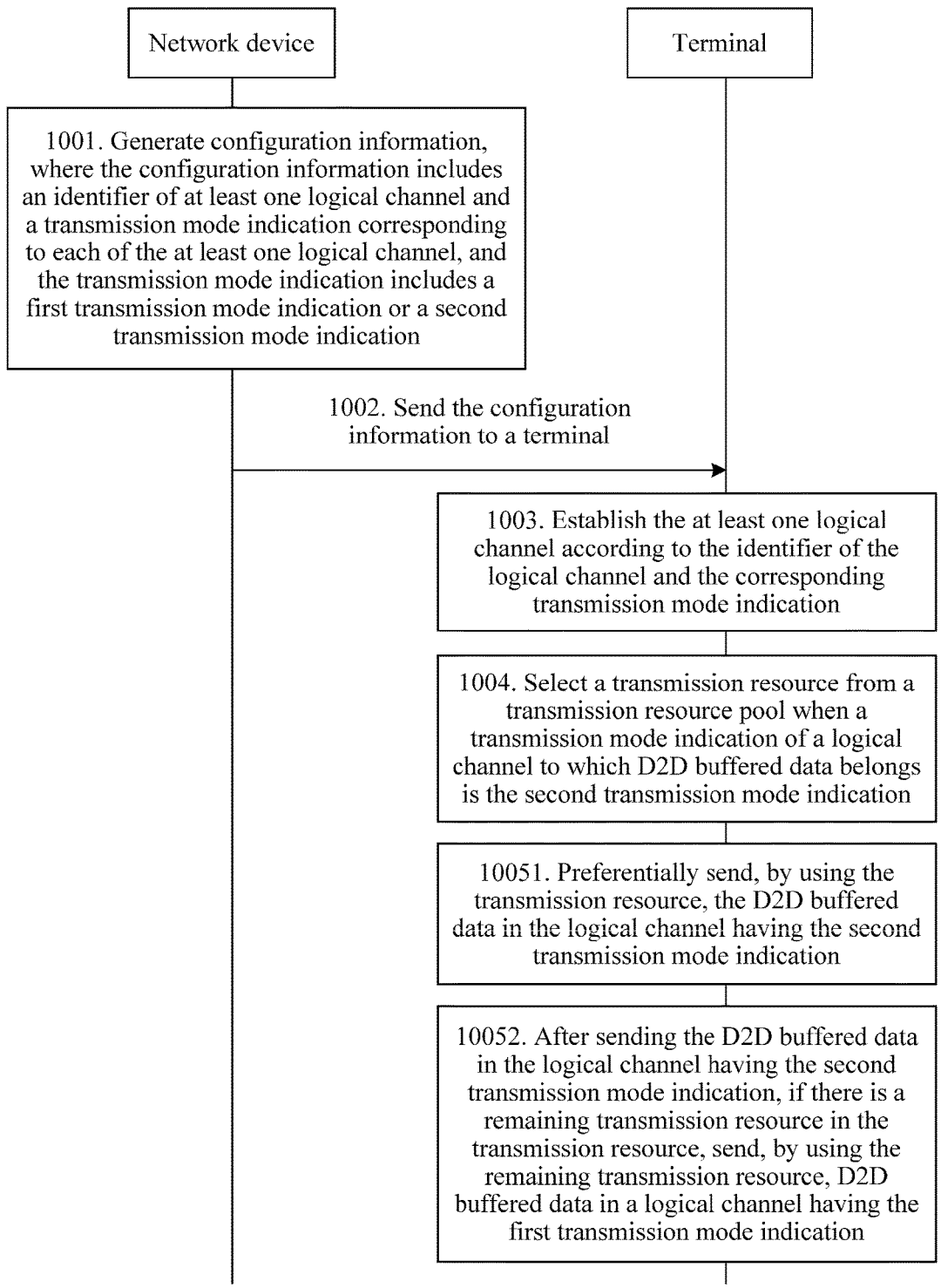
FIG. 15 is a flowchart of a data transmission method according to another embodiment of the present invention.

Similarly, in the embodiment in FIG. 10, there may also be a remaining transmission resource in the transmission resource autonomously selected by the terminal from the transmission resource pool. Optionally, as shown in FIG. 15, step 1005 may be replaced with step 10051 and step 10052 for implementation.

Step 10051: Preferentially send, by using the transmission resource, the D2D buffered data in the logical channel having the second transmission mode indication.

Step 10052: After sending the D2D buffered data in the logical channel having the second transmission mode indication, if there is a remaining transmission resource in the transmission resource, send, by using the remaining transmission resource, D2D buffered data in a logical channel having the first transmission mode indication.

In conclusion, according to the data transmission method provided in this embodiment, the remaining transmission resource is used to send the data in the logical channel having the first transmission mode indication, so that the transmission resource is effectively used, that is, a possibility of wasting the transmission resource autonomously selected by the terminal is reduced, and utilization of the transmission resource autonomously selected by the terminal is improved.

Figure 16:
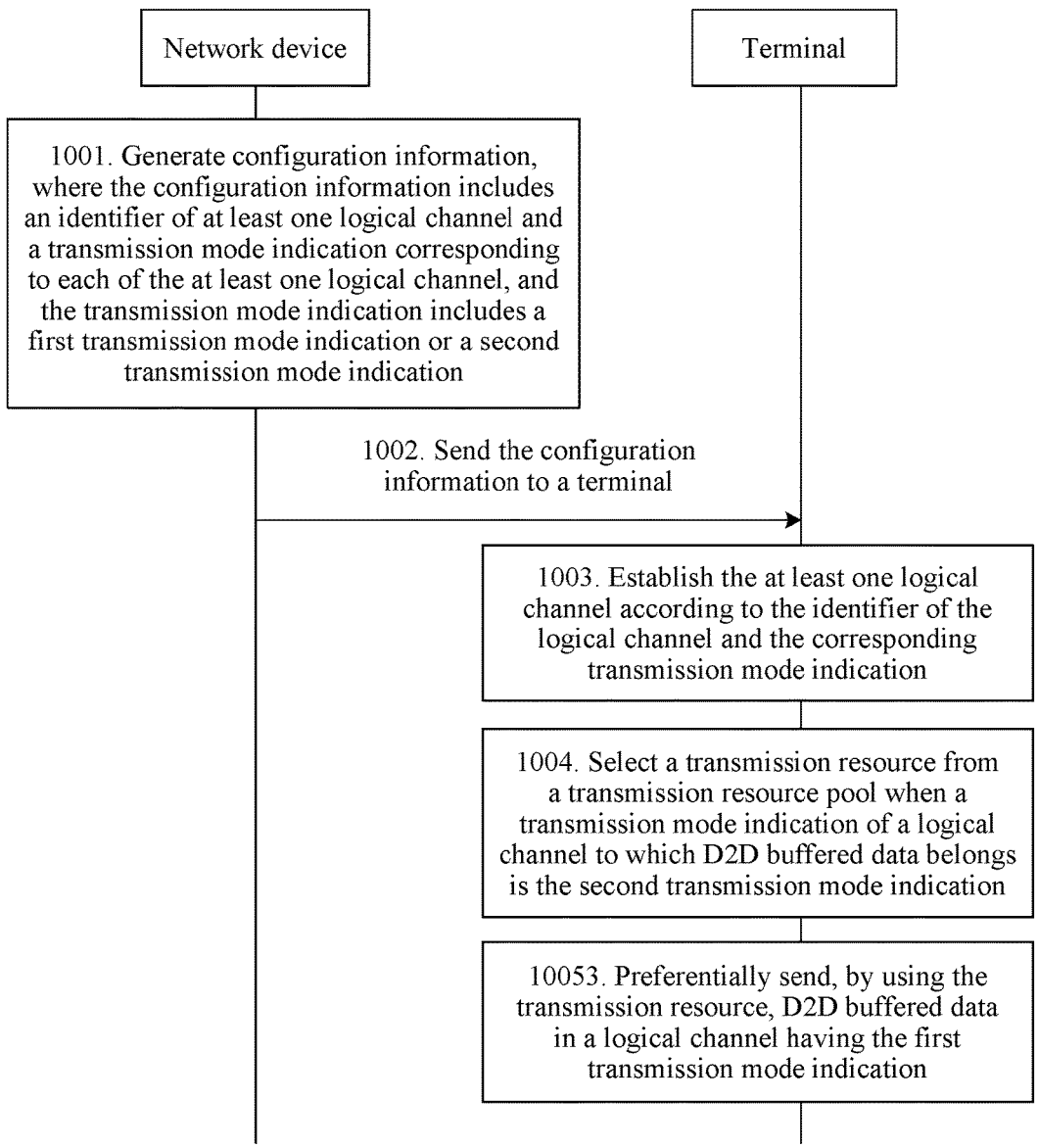
FIG. 16 is a flowchart of a data transmission method according to another embodiment of the present invention.

In addition, in the embodiment in FIG. 10, because a transmission link between the terminal and the network device may be disconnected or signal quality between the terminal and the network device may be extremely poor, alternatively, the transmission resource autonomously selected by the terminal from the transmission resource pool may be preferentially used to transmit D2D buffered data in a logical channel having the first transmission mode indication. Optionally, as shown in FIG. 16, step 1005 may be replaced with step 10053 for implementation.

Step 10053: Preferentially send, by using the transmission resource, D2D buffered data in a logical channel having the first transmission mode indication.

When a transmission condition between the terminal and the network device is poorer than a preset condition, the D2D buffered data in the logical channel having the first transmission mode indication is preferentially sent by using the transmission resource.

The preset condition includes at least one of the following conditions:

the transmission link between the terminal and the network device is disconnected;

the signal quality between the terminal and the network device is poorer than a preset condition; or a total data buffer size of the D2D buffered data in the logical channel having the first transmission mode indication in the terminal is greater than a preset threshold.

In addition, for any one of the foregoing method embodiments, because a quantity of logical channel identifiers (LCIDs) is usually limited, for example, an LCID 1 to an LCID 8, there are the following two configuration policies according to a network device.

In a first configuration policy, an identifier of a logical channel having a first transmission mode indication is different from an identifier of a logical channel having a second transmission mode indication.

For example, the LCID 1, the LCID 2, the LCID 3, and the LCID 4 are identifiers of logical channels having the first transmission mode indication, and the LCID 5, the LCID 6, the LCID 7, and the LCID 8 are identifiers of logical channels having the second transmission mode indication.

In a second configuration policy, an identifier of a logical channel having a first transmission mode indication is totally the same as, or partially the same as, an identifier of a logical channel having a second transmission mode indication.

For example, the LCID 1, the LCID 2, the LCID 3, the LCID 4, and the LCID 5 are identifiers of logical channels having the first transmission mode indication, and the LCID 4, the LCID 5, the LCID 6, the LCID 7, and the LCID 8 are identifiers of logical channels having the second transmission mode indication.

For another example, the LCID 1 to the LCID 8 may be identifiers of logical channels having the first transmission mode indication, and may also be identifiers of logical channels having the second transmission mode indication.

For the first configuration policy, when encapsulating D2D buffered data in a MAC SDU of a MAC PDU, a terminal may add a corresponding logical channel identifier to a MAC header of the MAC PDU.

When receiving the D2D buffered data, another terminal reports, to a corresponding upper-layer receiving entity according to the logical channel identifier added by each MAC SDU to the MAC header of the MAC PDU, the D2D buffered data encapsulated in the MAC SDU.

For the second configuration policy, when encapsulating D2D buffered data in a MAC SDU of a MAC PDU, a terminal may add a predetermined identifier to a MAC header of the MAC PDU. The predetermined identifier is used to indicate a combination of a logical channel identifier and a transmission mode indication. The identifier may be an independent identifier or a combination of two identifiers. The transmission mode indication is the first transmission mode indication or the second transmission mode indication.

When receiving the D2D buffered data, another terminal reports, to a corresponding upper-layer receiving entity according to the identifier added by each MAC SDU to the MAC header of the MAC PDU, the D2D buffered data encapsulated in the MAC SDU.

Figure 17:
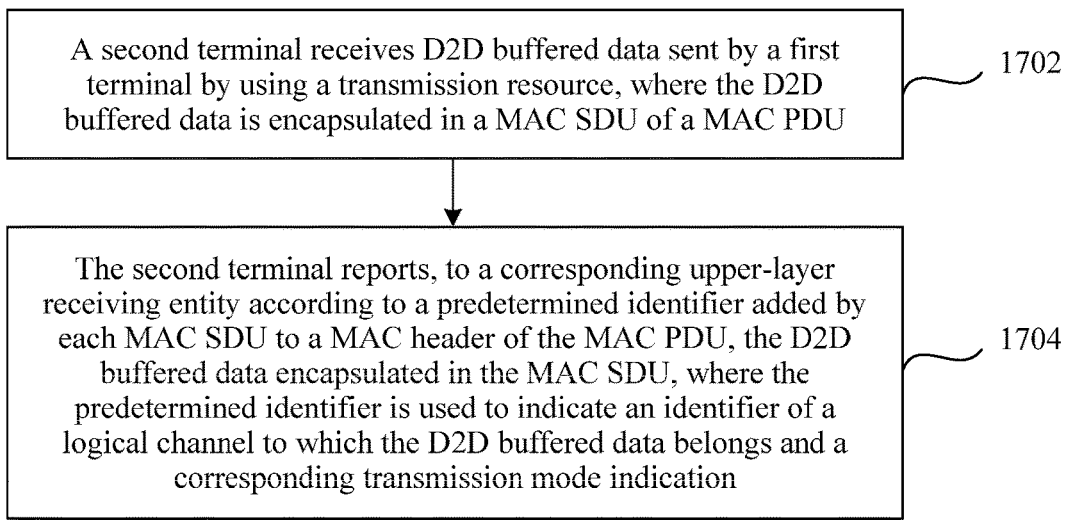
FIG. 17 is a flowchart of a data transmission method according to another embodiment of the present invention.

Referring to FIG. 17, FIG. 17 is a flowchart of a data transmission method according to an embodiment of the present invention. An example in which the data transmission method is applied to a second terminal is used for description in this embodiment. The method includes the following steps.

Step 1702: The second terminal receives D2D buffered data sent by a first terminal by using a transmission resource, where the D2D buffered data is encapsulated in a MAC SDU of a MAC PDU.

The transmission resource is obtained by the first terminal according to a transmission mode indication of a logical channel to which the D2D buffered data belongs. The transmission mode indication is a first transmission mode indication or a second transmission mode indication.

Step 1704: The second terminal reports, to a corresponding upper-layer receiving entity according to a predetermined identifier added by each MAC SDU to a MAC header of the MAC PDU, the D2D buffered data encapsulated in the MAC SDU, where the predetermined identifier is used to indicate an identifier of a logical channel to which the D2D buffered data belongs and a corresponding transmission mode indication.

Optionally, the predetermined identifier includes the identifier of the logical channel to which the D2D buffered data belongs and the corresponding transmission mode indication.

A logical channel having the first transmission mode indication uses a centralized resource allocation mode, and a logical channel having the second transmission mode indication uses a distributed resource allocation mode.

Figure 18:
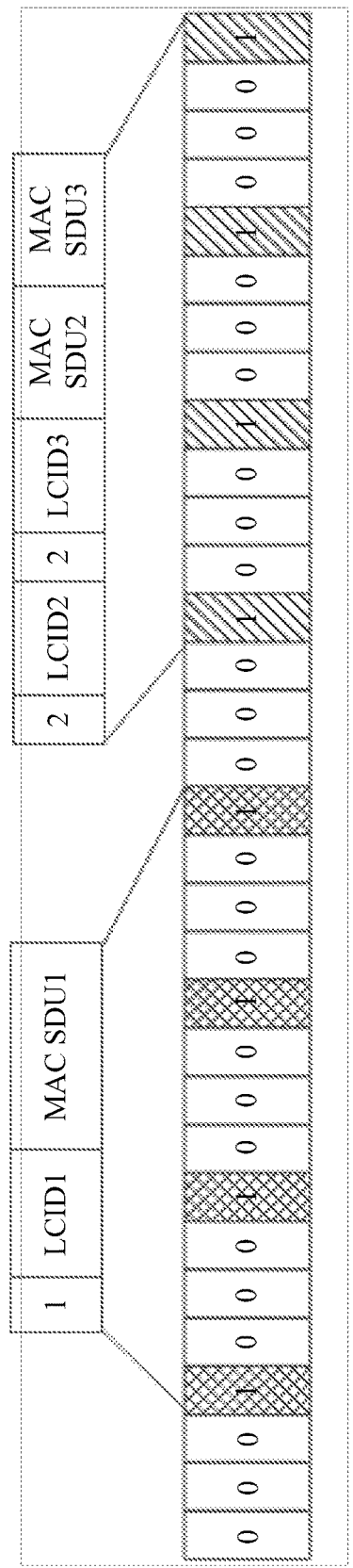
FIG. 18 is a schematic implementation diagram of the data transmission method provided in the embodiment shown in FIG. 17.

For example, in FIG. 18, a network device configures three logical channels for the first terminal. The logical channels include a logical channel 1 having the first transmission mode indication and two logical channels having the second transmission mode indication. The two logical channels having the second transmission mode indication are respectively denoted as a logical channel 2 and a logical channel 3 A logical channel identifier corresponding to the logical channel 1 is an LCID 1, a logical channel identifier corresponding to the logical channel 2 is an LCID 2, and a logical channel identifier corresponding to the logical channel 3 is an LCID 3.

When encapsulating the D2D buffered data, the first terminal adds, for corresponding data, not only a corresponding LCID but also a corresponding transmission mode indication to a MAC subheader of the MAC PDU. A MAC subheader for the logical channel 1 carries a first transmission mode indication identifier 1, and a MAC subheader for the logical channel 2 and a MAC subheader for the logical channel 3 carry second transmission mode indication identifiers 2.

After receiving the MAC PDU, the second terminal reports, to a first upper-layer receiving entity, a MAC SDU 1 having the LCID 1 and the first transmission mode indication identifier 1 in the MAC subheader; reports, to a second upper-layer receiving entity, a MAC SDU 2 having the LCID 1 and the second mode indication identifier 2 in the MAC subheader; and reports, to a third upper-layer receiving entity, a MAC SDU 3 having the LCID 3 and the second mode indication identifier 2 in the MAC subheader.

In conclusion, according to the data transmission method provided in this embodiment, a type of the D2D buffered data is identified by using the logical channel identifier and the transmission mode indication, so that even if identifiers of logical channels having different transmission mode indications are the same, the second terminal can report D2D buffered data to a correct upper-layer receiving entity.

It should be noted that, the foregoing embodiments are described by using an example in which a data transmission method is applied to a D2D communication mode, but are also applicable to another D2D communication scheme, which includes a D2D communication scheme in a current version and any communication scheme that is in a subsequent evolution version and in which only a same transmission mode is used, for example, a D2D discovery mode in a current version.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A data transmission apparatus comprising a processing system coupled to a memory programmed with executable instructions that, when executed by the processing system, configure a processing module and a sending module of the data transmission apparatus to perform the following functionality, wherein:
   the processing module is configured to obtain configuration information for each of a plurality of logical channels, wherein the configuration information for each logical channel of the plurality of channels comprises an identifier of the logical channel and a transmission mode indication corresponding to the logical channel, wherein the transmission mode of each logical channel is independently configurable from the transmission mode of other of the plurality of logical channels, and the transmission mode indication comprises a first transmission mode indication, indicating that the logical channel uses a centralized resource allocation mode, or a second transmission mode indication, indicating that the logical channel uses a distributed resource allocation mode,
   the processing module is configured to establish a logical channel of the plurality of logical channels, to which device-to-device (D2D) buffered data belongs, the logical channel established according to the identifier of the logical channel and the corresponding transmission mode indication of the logical channel; and
   the processing module is configured to obtain a transmission resource for the logical channel according to the transmission mode indication of the logical channel to which device-to-device (D2D) buffered data belongs; and
   a sending module, configured to send the D2D buffered data by using the transmission resource obtained by the processing module.

2. The apparatus according to claim 1, wherein the transmission mode indication of the logical channel to which the D2D buffered data belongs is the first transmission mode indication, and the memory is further programmed with executable instructions that, when executed by the processing system, configure a receiving module
   to receive grant information sent by a network device, wherein the grant information indicates the transmission resource.

3. The apparatus according to claim 2, wherein
   the sending module is further configured to send, by using the transmission resource obtained by the processing module, the D2D buffered data in the logical channel having the first transmission mode indication; or
   the sending module is further configured to: send, by using the transmission resource obtained by the processing module, the D2D buffered data in the logical channel having the first transmission mode indication; and after sending the D2D buffered data in the logical channel having the first transmission mode indication, if there is still a remaining transmission resource in the transmission resource, send, by using the remaining transmission resource, D2D buffered data in the logical channel having the second transmission mode indication.

4. The apparatus according to claim 3, wherein there are at least two logical channels of the plurality of logical channels having the second transmission mode indication;
   the processing module is configured to: after the D2D buffered data in the logical channel having the first transmission mode indication is sent, if there is the remaining transmission resource in the transmission resource, obtain a priority corresponding to each logical channel having the second transmission mode indication;
   the processing module is further configured to allocate, according to the priority or a data buffer size in each logical channel having the second transmission mode indication, the remaining transmission resource to at least one logical channel having the second transmission mode indication; and
   the sending module is further configured to send, by using the remaining transmission resource, D2D buffered data in the logical channel to which the remaining transmission resource is allocated by the processing module.

5. The apparatus according to claim 3, wherein there are at least two logical channels of the plurality of logical channels having the second transmission mode indication;
   the processing module is configured to: after the D2D buffered data in the logical channel having the first transmission mode indication is sent, if there is the remaining transmission resource in the transmission resource, obtain a priority and an upper limit to single transmission resource allocation that are corresponding to each second logical channel;
   the processing module is further configured to allocate, according to the priority and the upper limit to single transmission resource allocation, the remaining transmission resource to at least one logical channel having the second transmission mode indication; and
   the sending module is further configured to send, by using the remaining transmission resource, the D2D buffered data in the logical channel to which the remaining transmission resource is allocated by the processing module.

6. The apparatus according to claim 1, wherein the transmission mode indication of the logical channel to which the D2D buffered data belongs is the second transmission mode indication; and
   the processing module is configured to select the transmission resource from a transmission resource pool, wherein
   the transmission resource pool is a preconfigured transmission resource pool, the transmission resource pool is configured according to broadcast information from a network device, or the transmission resource pool is configured according to radio resource control (RRC) dedicated signaling from the network device.

7. The apparatus according to claim 6, wherein
the sending module is configured to send, by using the transmission resource obtained by the processing module, the D2D buffered data in the logical channel having the second transmission mode indication; or
the sending module is configured to: send, by using the transmission resource obtained by the processing module, the D2D buffered data that belongs to the logical channel having the second transmission mode indication; and after sending the D2D buffered data in the logical channel having the second transmission mode indication, if there is a remaining transmission resource in the transmission resource, send, by using the remaining transmission resource, D2D buffered data in the logical channel having the first transmission mode indication.

8. The apparatus according to claim 1, wherein
in a first policy for configuring the transmission mode of each of the plurality of logical channels, a list of identifiers of the logical channels in the plurality of logical channels having the first transmission mode indication is mutually exclusive to a list of identifiers of the logical channels in the plurality of logical channels having the second transmission mode indication; or
in second policy for configuring the transmission mode of each of the plurality of logical channels, a list of identifiers of the logical channels in the plurality of channels having the first transmission mode indication is not mutually exclusive to a list of identifiers of the logical channels in the plurality of channels having the second transmission mode indication.

9. The apparatus according to claim 8, wherein when configuring a logical channel in the plurality of logical channels using the second policy,
a Media Access Control protocol data unit (MAC PDU) header corresponding to a Media Access Control service data unit (MAC SDU) used for encapsulating the D2D buffered data carries a predetermined identifier, wherein
the predetermined identifier indicates the identifier of the logical channel to which the D2D buffered data belongs and the corresponding transmission mode indication.

10. A data transmission method, wherein the method comprises:
obtaining, by a first terminal, configuration information for each of a plurality of logical channels, wherein the configuration information for each logical channel of the plurality of logical channels comprises an identifier of the logical channel and a transmission mode indication corresponding to the logical channel, wherein the transmission mode of each logical channel is independently configurable from the transmission mode of other of the plurality of logical channels, and the transmission mode indication comprises a first transmission mode indication, indicating that the logical channel uses a centralized resource allocation mode, or a second transmission mode indication, indicating that the logical channel uses a distributed resource allocation mode;
establishing, by the first terminal, a logical channel of the plurality of logical channels, to which device-to-device (D2D) buffered data belongs, the logical channel established according to the identifier of the logical channel and the corresponding transmission mode indication of the logical channel;
obtaining, by the first terminal, a transmission resource for the logical channel according to the transmission mode indication of the logical channel to which device-to-device (D2D) buffered data belongs; and
sending, by the first terminal, the D2D buffered data by using the obtained transmission resource.

11. The method according to claim 10, wherein the transmission mode indication of the logical channel to which the D2D buffered data belongs is the first transmission mode indication; and
the obtaining, by the first terminal, the transmission resource according to the transmission mode indication of the logical channel to which D2D buffered data belongs comprises:
receiving grant information sent by a network device, wherein the grant information indicates the transmission resource.

12. The method according to claim 11, wherein the sending, by the first terminal, the D2D buffered data by using the obtained transmission resource comprises:
sending, by using the transmission resource, the D2D buffered data in the logical channel having the first transmission mode indication; or
sending, by using the transmission resource, the D2D buffered data in the logical channel having the first transmission mode indication; and after sending the D2D buffered data in the logical channel having the first transmission mode indication, if there is still a remaining transmission resource in the transmission resource, sending, by using the remaining transmission resource, the D2D buffered data in the logical channel having the second transmission mode indication.

13. The method according to claim 12, wherein there are at least two logical channels of the plurality of logical channels having the second transmission mode indication; and
the sending, by using the remaining transmission resource, the D2D buffered data in the logical channel having the second transmission mode indication, after sending the D2D buffered data in the logical channel having the first transmission mode indication, if there is a remaining transmission resource in the transmission resource comprises:
after the D2D buffered data in the logical channel having the first transmission mode indication is sent, if there is the remaining transmission resource in the transmission resource, obtaining a priority corresponding to each logical channel having the second transmission mode indication;
allocating, according to the priority and/or a data buffer size in each logical channel having the second transmission mode indication, the remaining transmission resource to at least one logical channel having the second transmission mode indication; and
sending, by using the remaining transmission resource, the D2D buffered data in the logical channel to which the remaining transmission resource is allocated.

14. The method according to claim 12, wherein there are at least two logical channels of the plurality of logical channels having the second transmission mode indication; and
the sending, by using the remaining transmission resource, D2D buffered data that belongs to the second logical channel, after sending the D2D buffered data in the logical channel having the first transmission mode indication, if there is a remaining transmission resource in the transmission resource comprises:
after the D2D buffered data in the logical channel having the first transmission mode indication is sent, if there is the remaining transmission resource in the transmission resource, obtaining a priority and an upper limit to single transmission resource allocation that are corresponding to each second logical channel;

allocating, according to the priority and the upper limit to single transmission resource allocation, the remaining transmission resource to the at least one logical channel having the second transmission mode indication; and sending, by using the remaining transmission resource, the D2D buffered data in the logical channel to which the remaining transmission resource is allocated.

15. The method according to claim 10, wherein the transmission mode indication of the logical channel to which the D2D buffered data belongs is the second transmission mode indication; and the obtaining, by the first terminal, a transmission resource according to the transmission mode indication of a logical channel to which D2D buffered data belongs comprises:

selecting the transmission resource from a transmission resource pool, wherein the transmission resource pool is a preconfigured transmission resource pool, the transmission resource pool is configured according to broadcast information from a network device, or the transmission resource pool is configured according to radio resource control (RRC) dedicated signaling from the network device.

16. The method according to claim 15, wherein the sending, by the first terminal, the D2D buffered data by using the obtained transmission resource comprises:

sending, by using the transmission resource, the D2D buffered data in the logical channel having the second transmission mode indication; or sending, by using the transmission resource, the D2D buffered data that belongs to the logical channel having the second transmission mode indication; and after sending the D2D buffered data in the logical channel having the second transmission mode indication, if there is a remaining transmission resource in the transmission resource, sending, by using the remaining transmission resource, the D2D buffered data in the logical channel having the first transmission mode indication.

17. The method according to claim 10, wherein in a first policy for configuring the transmission mode of each of the plurality of logical channels, a list of identifiers of the logical channels in the plurality of logical channels having the first transmission mode indication is mutually exclusive to a list of identifiers of the logical channels in the plurality of logical channels having the second transmission mode indication; or in a second policy for configuring the transmission mode of each of the plurality of logical channels, a list of identifiers of the logical channels in the plurality of channels having the first transmission mode indication is not mutually exclusive to a list of identifiers of the logical channels in the plurality of logical channels having the second transmission mode indication.

18. The method according to claim 17, wherein when configuring a logical channel in the plurality of logical channels using the second policy, a Media Access Control protocol data unit (MAC PDU) header corresponding to a Media Access Control service data unit (MAC SDU) used for encapsulating the D2D buffered data carries a predetermined identifier, wherein the predetermined identifier indicates the identifier of the logical channel to which the D2D buffered data belongs and the corresponding transmission mode indication.

19. A data transmission method, wherein the method comprises:

generating, by a network device, configuration information for each of a plurality of logical channels, wherein the configuration information for each of logical channel in the plurality of logical channels comprises an identifier of the logical channel and a transmission mode indication corresponding to the logical channel, wherein the transmission mode of each logical channel is independently configurable from the transmission mode of other of the plurality of logical channels, and the transmission mode indication comprises a first transmission mode indication, indicating that the logical channel uses a centralized resource allocation mode, or a second transmission mode indication, indicating that the logical channel uses a distributed resource allocation mode; and sending, by the network device, the configuration information to a first terminal.

20. The method according to claim 19, wherein after the sending, by the network device, the configuration information to the first terminal, the method further comprises:

sending grant information to the first terminal, wherein the grant information indicates the transmission resource for transmitting device-to-device (D2D) buffered data, and the D2D buffered data is data in the logical channel in the plurality of logical channels having the first transmission mode indication.

* * * * *